United States Patent
Roe et al.

(10) Patent No.: US 10,038,938 B1
(45) Date of Patent: Jul. 31, 2018

(54) SYSTEMS AND METHODS FOR CONTROLLING PERMISSIONS TO CHANGE PARENTAL CONTROL SETTINGS BASED ON VOCAL CHARACTERISTICS OF A USER

(71) Applicant: Rovi Guides, Inc., San Carlos, CA (US)

(72) Inventors: Glen E. Roe, Simi Valley, CA (US); Michael McCarty, Agoura Hills, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/612,465

(22) Filed: Jun. 2, 2017

(51) Int. Cl.
| | |
|---|---|
| *H04N 7/16* | (2011.01) |
| *H04N 21/475* | (2011.01) |
| *H04N 21/45* | (2011.01) |
| *H04N 21/454* | (2011.01) |
| *H04N 21/439* | (2011.01) |
| *G10L 15/22* | (2006.01) |
| *G10L 15/18* | (2013.01) |
| *G10L 25/51* | (2013.01) |
| *H04N 21/422* | (2011.01) |

(52) U.S. Cl.
CPC ..... *H04N 21/4751* (2013.01); *G10L 15/1822* (2013.01); *G10L 15/22* (2013.01); *G10L 25/51* (2013.01); *H04N 21/42203* (2013.01); *H04N 21/4394* (2013.01); *H04N 21/454* (2013.01); *H04N 21/4532* (2013.01); *H04N 21/4755* (2013.01); *G10L 2015/223* (2013.01)

(58) Field of Classification Search
CPC ......... H04N 21/4751; H04N 21/42203; H04N 21/4394; H04N 21/4532; H04N 21/454; H04N 21/4755; G10L 15/1822; G10L 15/22; G10L 25/51; G10L 2015/223
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 6,829,582 B1 | 12/2004 | Barsness |
| 6,834,308 B1 | 12/2004 | Ikezoye et al. |
| 7,165,098 B1 | 1/2007 | Boyer et al. |
| 7,360,234 B2 | 4/2008 | Robson et al. |
| 7,761,892 B2 | 7/2010 | Ellis et al. |

(Continued)

*Primary Examiner* — Kyu Chae
(74) *Attorney, Agent, or Firm* — Haley Guiliano LLP

(57) ABSTRACT

Systems and methods for controlling permissions to change parental control settings based on vocal characteristics of a user. In some aspects, the media guidance application may receive a voice command from a user to update a parental control setting. The media guidance application may determine both what the requested change is and an age (or age range) of the user is who is attempting to change the parental control setting based on vocal characteristics of the voice command. If the media guidance application determines that an age range associated with the user exceeds an age associated with the requested change to the parental control setting, the media guidance application may update the parental control setting at a media device based on the requested change. Accordingly, the media guidance application may allow only users of appropriate ages to change parental control settings at the media device.

20 Claims, 10 Drawing Sheets

(56) References Cited

U.S. PATENT DOCUMENTS

| | | | |
|---|---|---|---|
| 8,046,801 B2 | 10/2011 | Ellis et al. | |
| 8,079,044 B1 | 12/2011 | Craner | |
| 8,281,361 B1 | 10/2012 | Schepis et al. | |
| 8,762,397 B2 | 6/2014 | Basso et al. | |
| 9,338,493 B2 | 5/2016 | Van Os et al. | |
| 9,351,025 B1 | 5/2016 | Maughan et al. | |
| 2002/0147782 A1 | 10/2002 | Dimitrova et al. | |
| 2002/0174430 A1 | 11/2002 | Ellis et al. | |
| 2003/0163811 A1 | 8/2003 | Luehrs | |
| 2004/0148638 A1 | 7/2004 | Weisman et al. | |
| 2005/0251827 A1 | 11/2005 | Ellis et al. | |
| 2006/0130118 A1 | 6/2006 | Damm | |
| 2010/0153885 A1 | 6/2010 | Yates | |
| 2011/0237324 A1* | 9/2011 | Clavin | G06K 9/00369 463/29 |
| 2016/0057497 A1* | 2/2016 | Kim | H04N 21/44218 725/10 |
| 2017/0242657 A1* | 8/2017 | Jarvis | G06F 3/167 |

* cited by examiner

| 302 | PG | PG-13 | R | Purchasing |
|---|---|---|---|---|
| "Block" | 0 | 5 | 10 | 16 |
| "Unblock" | 10 | 13 | 18 | 16 |
| "Allow" | 10 | 13 | 18 | 16 |
| "Prevent" | 0 | 5 | 10 | 16 |

FIG. 3

| Voice Characteristic | Age Range | Weight |
|---|---|---|
| Speaking Rate (Words/Sec) | | |
| >3 | 3-12 | 0.5 |
| 2-3 | 12-16 | 0.5 |
| <2 | >16 | 0.8 |
| Mean Fundamental Frequency (Hz) | | |
| <170 (Male) | >16 | 0.8 |
| 170-250 (Female) | >16 | 0.6 |
| 250-350 (Male or Female) | 12-16 | 0.5 |
| >350 (Male or Female) | 3-12 | 0.8 |
| Average Word Duration (ms) | | |
| <25 | 3-12 | 0.3 |
| 25-50 | 12-16 | 0.9 |
| >50 | >16 | 0.1 |

FIG. 4

SYSTEMS AND METHODS FOR CONTROLLING PERMISSIONS TO CHANGE PARENTAL CONTROL SETTINGS BASED ON VOCAL CHARACTERISTICS OF A USER

BACKGROUND

Conversational systems have become increasingly common in households around the globe. With the increased prevalence of these systems, users have become increasingly dependent on the conversational systems. However, with the increased prevalence of these devices, children are becoming more adept at using, and abusing, these systems. For example, children may know how to activate a conversational system and input commands to change settings put in place by their parents. For example, while the parent is away, the child may ask the system to unblock R-rated movies on their television, a block that was input by their parents. While some conversational systems will only respond to certain users registered with the system, it can be cumbersome to users or parents to have to input, for each user in the house, which settings those users are, or may not be, allowed to change. Ultimately, this may frustrate parents who use these conversational systems, as their child may gain access to programming that is not appropriate for the child because the parent forgot to change the child's permissions.

SUMMARY

Accordingly, systems and methods are described herein for controlling permissions to change parental control settings based on vocal characteristics of a user. These systems and methods may be implemented by a media guidance application (e.g., executed by user equipment associated with the user). In some aspects, the media guidance application may receive a voice command from a user to update a parental control setting. The media guidance application may determine both what the requested change is and an age (or age range) of the user who is attempting to change the parental control setting based on vocal characteristics of the voice command. If the media guidance application determines that an age range associated with the user exceeds the age associated with the requested change to the parental control setting, the media guidance application may update the parental control setting at a media device based on the requested change. In this way, the media guidance application may allow only users of appropriate ages to change parental control settings at the media device without a user having to indicate which users are allowed to change what settings.

For example, a user may utter a command (e.g., "Unblock R-rated movies") to a voice-based input device. The media guidance application may receive the audio input of the utterance and parse the audio into a plurality of words, which may be compared to a command database to determine that the audio input includes a parental control instruction (e.g., "Unblock" and "R-rated" may be found in the command database). The media guidance application may determine an age range corresponding to the user in the audio input based on vocal characteristics (e.g., average word length, mean fundamental frequency, or speaking rate) of the user. If the age range corresponding to the user exceeds the age associated with the parental control instruction (e.g., unblocking R-rated programs may be associated with an age of 18), the parental control setting is updated at the device based on the parental control instruction (e.g., R-rated programs will be unblocked).

The media guidance application may receive, from a voice-based input device, an audio input of an utterance of a user, for example, the user saying "Unblock PG-13 programs," and parse the audio input into a plurality of words (e.g., "Unblock," "PG-13," and "programs"). The media guidance application may compare some of the parsed words (e.g., "Unblock" and "PG-13") to a command database to determine whether they correspond to an entry in the command database, indicating that the audio input of the utterance of the user was an instruction regarding parental controls. If the media guidance application determines that the words correspond to the entry, the media guidance application may access the entry to determine the parental control instruction (e.g., "Unblock PG-13-rated media content) including a parental control level ("PG-13-rated").

The media guidance application may further process the audio input to determine vocal characteristics of the user, such as his or her speaking rate, mean fundamental frequency, and average word duration. These characteristics may be indicative of the age of the user. The media guidance application may compare the vocal characteristics to a voice database that aids the media guidance application in determining the age range of the user. For example, the media guidance application may determine that the user is between 16 and 20 years old based on the comparison. The voice database may be populated by sampling the vocal characteristics of a plurality of users who input their age into their media guidance applications, and then, using those samples, determine average signatures for each vocal characteristic and age pair. In this way, when the vocal characteristics of the user are compared to the vocal characteristics in the voice database, they can be compared to the average signatures to find the closest signature, and thus determine the age of the user.

Furthermore, each vocal characteristic and age pair may have a weight associated with them, which may indicate how deterministic the vocal characteristic is of the age or age range (which may be associated with a deviation of the voice samples from the average signature or some other regression technique). The media guidance application may sum the weights for all vocal characteristics that correlate to a specific age range, and then determine which age range has the greatest sum. For example, the media guidance application may determine that the age range of 16 to 20 years old may have a sum of 1.5 whereas the age range of six to 12 years old may only have a sum of 0.2. The age range of 16 to 20 years old may be used as the age range for the user because it has the greater sum. However, if the sums for multiple age ranges exceed a threshold, that is, if the sum for six to 12 years old had been 1.3 or 1.4 and the threshold was 1.2, the media guidance application may determine that there is too much uncertainty in the age of the user, and thus determine that the age range should be the null set, which means that the user should not be authorized to make any updates to the parental control settings on the media device as their age could not be determined. In the alternative, the age range may be set to 0, such that the user may be allowed to make certain updates that don't require a minimum age.

The media guidance application may determine what the current parental control level at the media device is. The media guidance application may compare an age range corresponding to the user (e.g., 16 to 20 years old) to an age associated with updating the parental control setting from the second parental control level based on the first parental control instruction. For example, any update related to the PG-13-rating parental control level may be associated with an age of 13. In some embodiments, the media guidance application may determine that the age of 13 is associated with the PG-13-rating based on a table associating parental control instructions with a plurality of ages and comparing the parental control level (e.g., PG-13-ratings) to the table. In some embodiments, the media guidance application may additionally determine a parental control update command (e.g., "Unblock") included in the audio input as part of determining the parental control instruction, and may further compare the parental control update command to the table. For example, unblocking PG-13-rated content may be associated with an age of 13, but blocking PG-13-rated content may be associated with a lower age, such as five years old. Furthermore, the media guidance application may also compare the parental control level on the media device with the requested parental control level. For example, if the user is requesting to unblock PG-13-rated content, but R-rated movies are already unblocked, then the media guidance application may allow the update to occur regardless of the age range of the user.

The media guidance application may update the parental control setting at the media device from the parental control level (e.g., allowing PG-rated (or less) media content) at the media device to the first parental control level (e.g., allowing PG-13-rated (or less) media content) if the age range exceeds the age associated with updating the parental control level at the media device based on the first parental control instruction. However, if the age range does not exceed the age, then the media guidance application may maintain the parental control level (e.g., allowing PG-rated (or less) media content) at the media device and not update the parental control level. In either case, an authorized user (such as the parent) may respond to a notification that the parental control level at the media device will be updated/maintained. For example, the media guidance application may notify the user that the parental control level will be updated from PG-rating to PG-13 rating and the authorized user may say, "No, don't!" Based on determining that this command negates the previous command, the media guidance application may revert the parental control setting to the original parental control level at the media device. Similarly, if the media guidance application notifies the authorized user that the parental control setting of PG-rating is to be maintained, the authorized user may say "It's ok!" Based on determining that this command affirms the previous command, the media guidance application may update the parental control setting to PG-13-rating.

Finally, the media guidance application may receive a subsequent command and treat this command differently if the command is changing the same parental control setting of a particular type (e.g., a type may be updating ratings or updating how much the user is allowed to spend on purchased programming). For example, if the user, who may have an age range of 12-16, had requested to block R-rated programming, which may be associated with an age of 10, the media guidance application may update the parental control setting. That same user, or a user associated with an age range of 16-17, may later request to unblock R-rated programming, which may be associated with an age of 18. Normally, neither user may be able to unblock R-rated programming. However, based on determining that the second request (to unblock R-rated programming) is of the same type as the first request (to block R-rated programming) and that the user issuing the second request is the same age or older than the user who issued the first request, the media guidance application may allow this update to occur.

In some aspects, the media guidance application may receive, from a voice-based input device, an audio input of an utterance of a user. For example, the media guidance application may receive, over a communication link from the voice-based input device, an audio input of the user saying "Unblock PG-rated movies." In some embodiments, the media guidance application may, based on receiving the audio input, parse the audio input into a first plurality of words. In some embodiments, the media guidance application may run a natural language understanding subprocess locally to convert the audio clip into a string of words. In other embodiments, the media guidance application may transmit the audio input to a server or other dedicated processor to parse the audio input.

In some embodiments, the media guidance application may compare a first subset of the first plurality of words to a command database to determine that the first subset of the first plurality of words corresponds to a command entry in the command database. For example, the media guidance application may retrieve a data structure or table comprising a plurality of parental control update commands and a plurality of parental control levels. For example, the plurality of parental control update commands may be "Unblock," "Block," "Allow," "Prevent," "Unblock for [time period]," and "Block for [time period]." The plurality of parental control levels may be "G," "PG," "PG-13," "R," "Violence," "Language," "Sexual content," "Nudity," "Purchasing," "Purchasing+[monetary value]" "TV-G," "TV-PG," "TV-14," "TV-MA," "E," "E-10-Plus," "T," and "M." The media guidance application may determine that "PG" (a first subset) relates to the same parental control level in the command database. The media guidance application may therefore determine that the audio input comprises a parental control instruction. In some embodiments, the media guidance application may also compare a second subset of the first plurality of words to the command database to determine a first parental control update command. For example, the media guidance application may determine that "Unblock" corresponds to the same parental control update command in the command database as described above.

In some embodiments, the media guidance application may, based on determining that the first subset corresponds to the command entry in the command database, access the command entry corresponding to the first subset. For example, the media guidance application may query the command database for the command entry corresponding to the "PG" or corresponding to both "Unblock" and "PG." The media guidance application may receive, in response, the command entry. In some embodiments, the media guidance application may extract, from the command entry, a first parental control instruction. The first parental control instruction may comprise a first parental control level. In some embodiments, the first parental control instruction may also comprise the first parental control update command. For example, the media guidance application may extract, by executing an SQL script utilizing the declarative "Select" command, from the command entry, the first parental control instruction to "unblock PG-13 rated content."

In some embodiments, the media guidance application may process the audio input, using an audio input analysis process, to determine a plurality of vocal characteristics of the user. In some embodiments, the media guidance application may run the audio input analysis process locally to determine the plurality of vocal characteristics. In other embodiments, the media guidance application may transmit the audio input to a server or other dedicated processor to determine the plurality of vocal characteristics. For example, the media guidance application may determine that the audio input has a speaking rate of 3.3 words per second, a mean fundamental frequency of 330 Hertz (Hz), and an average word duration of 45 milliseconds (ms).

In some embodiments, the media guidance application may compare the plurality of vocal characteristics to a voice database associating vocal characteristics of the user with a plurality of age ranges. For example, the media guidance application may access a table that associates vocal characteristics with a plurality of age ranges. For example, the table may associate a speaking rate of greater than three words per second with an age range of greater than sixteen years old, a speaking rate of two to three words per second with an age range of twelve to sixteen years old, and a speaking rate of less than two words per second with an age range of three to twelve years old. The table may further associate a mean fundamental frequency of less than 170 Hertz for a male speaker with an age range of greater than sixteen years old, a mean fundamental frequency of between 170 and 250 Hertz for a female speaker with an age range of greater than sixteen years old, a mean fundamental frequency of between 250 and 350 Hertz for a female or male speaker with an age range of between twelve and sixteen years old, and a mean fundamental frequency of greater than 350 Hertz for a female or male speaker with an age range of between three and twelve years old. The table may further associate an average word duration of less than 25 milliseconds with an age range of greater than sixteen years old, a average word duration of between 25 and 50 milliseconds with an age range of between twelve and sixteen years old, and a average word duration of greater than 50 milliseconds with an age range of between three and twelve years old.

In some embodiments, the media guidance application may create the voice database using crowdsourced data. For example, the media guidance application may receive, from a plurality of media devices, a plurality of data structures. The plurality of data structures may comprise a plurality of audio inputs and a plurality of ages of a plurality of users, each data structure containing a respective audio input associated with an age of a respective user speaking in the respective audio input. For example, the media guidance application may receive three data structures from three media devices. The first may contain a first audio input from a sixteen-year-old user, the second may contain a second audio input from a thirteen-year-old user, and the third may contain a third audio input from a nine-year-old user.

In some embodiments, the media guidance application may process the plurality of audio inputs to determine a plurality of sets of vocal characteristics. For example, the media guidance application may process the first data structure to determine that the first audio input has a speaking rate of 2.7 words per second, a mean fundamental frequency of 270 Hertz, and an average word duration of 40 milliseconds. The media guidance application may process the second data structure to determine that the second audio input has a speaking rate of 2.3 words per second, a mean fundamental frequency of 330 Hertz, and an average word duration of 35 milliseconds. The media guidance application may process the third data structure to determine that the third audio input has a speaking rate of 3.5 words per second, a mean fundamental frequency of 400 Hertz, and an average word duration of 20 milliseconds. In some embodiments, the media guidance application may determine, for each vocal characteristic, an average signature associated with each age based on the plurality of sets of vocal characteristics to create a plurality of average signatures. For example, the media guidance application may determine, based on these audio inputs and additional audio inputs, the ranges for each vocal characteristics and age range pairing, similar to those discussed above in relation to the table accessed from the voice database. The media guidance application may then associate each of the plurality of average signatures with a respective age in a data structure. For example, the media guidance application may associate the average audio signatures with the respective age in a table similar to that described above.

In some embodiments, the media guidance application may determine, based on the comparison of the plurality of vocal characteristics of the user to the voice database, an age range of the plurality of age ranges corresponding to the user. For example, the media guidance application may determine that the age range corresponding to the user is twelve to sixteen based on the comparison of the user's vocal characteristics with the voice database. In some embodiments, the media guidance application may determine the age range corresponding to the user using a probability model. For example, the media guidance application may compare each of the plurality of vocal characteristics of the user to the plurality of vocal characteristics in the voice database to determine a plurality of age ranges associated with the plurality of vocal characteristics of the user and a plurality of weights associated with the plurality of vocal characteristics of the user. These weights may be indicative of how closely correlated the vocal characteristic is with the age range. For example, the media guidance application may compare the speaking rate of 3.3 words per second to the table to determine that it is associated with an age range of three to twelve and a weight of 0.5, the mean fundamental frequency of 330 Hertz to the table to determine that it is associated with an age range of twelve to sixteen and a weight of 0.5, and the average word duration of 45 milliseconds to the table to determine that it is associated with an age range of twelve to sixteen and a weight of 0.9.

In some embodiments, the media guidance application may determine a plurality of sums. Each sum may be associated with a respective age range, and calculated by summing weights associated with vocal characteristics associated with the respective age range. For example, the media guidance application may determine that the sum associated with the age range of twelve to sixteen is 1.4, and may determine that the sum associated with the age range of three to twelve is 0.5. In some embodiments, the media guidance application may determine the greatest sum of the plurality of sums. For example, the media guidance application may determine that the sum of 1.4 is the highest sum. In some embodiments, the media guidance application may determine that the age range associated with the user is the age range associated with the greatest sum. For example, based on determining that 1.4 is the greatest sum, the media guidance application may determine that the age range of the user is twelve to sixteen.

In some embodiments, the media guidance application may determine that at least two of the plurality of sums exceed a threshold sum. For example, the media guidance application may instead determine that the sum for the age range of three to twelve is 1.2. The media guidance application may determine the threshold sum, which may be a predetermined number, or may be calculated based on the greatest sum (e.g., may be a certain percentage, such as 80%, of the greatest sum). The media guidance application may, based on determine that at least two of the plurality of sums exceed the threshold sum, determining that the age range is a null age range. For example, the media guidance application may determine that the sums of 1.2 and 1.5 exceed the threshold sum of 1.0, and may therefore determine that the age range is a null age range, which may indicate that the media guidance application cannot determine the age range.

In some embodiments, the media guidance application may query memory for a second parental control level, where the second parental control level is a parental control setting at a media device. For example, the media guidance application may access, from the memory, that the parental control level at the media device is blocking all programming that is rated higher than "G." In some embodiments, the media guidance application may compare the age range corresponding to the user to an age associated with updating the parental control setting from the second parental control level based on the first parental control instruction to determine whether the age range corresponding to the user exceeds the age associated with updating the parental control setting from the second parental control level based on the first parental control instruction. For example, the media guidance application may determine that the age range of twelve to sixteen, which corresponds to the user, exceeds the age associated with updating the parental control setting from blocking all programming that is rated higher than "G" to unblocking "PG-rated" content, which may be ten years old. Note that in embodiments where the age range is set to be the null age range as described above, the media guidance application may determine that the age range corresponding to the user does not exceed the age associated with updating the parental control setting from the second parental control level based on the first parental control instruction.

In some embodiments, the media guidance application may determine the age associated with updating the parental control setting from the second parental control level based on the first parental control instruction by transmitting, to a parental control database, a request for a table associating a plurality of control instructions with a plurality of ages, and receive, from the parental control database, a data packet containing the table. In some embodiments, the media guidance application may compare the first parental control level, that is, the parental control level of the first parental control instruction contained in the audio input from the user, with the table to determine the age of the plurality of ages associated with the first parental control level. For example, the media guidance application may compare the first parental control level of "PG-rated content" with the table to determine that updating based on a parental control instruction associated with a parental control level of "PG-rated content" is associated with an age of ten. In some embodiments, the media guidance application may further compare the first parental control update command, that is, the first parental control update command of the first parental control instruction contained in the audio input from the user, with the table to determine an age range associated with both the first parental control level and the first parental control update command to determine the age associated with updating the parental control setting from the second parental control level based on the first parental control instruction. For example, the media guidance application may compare the first parental control level of "PG-rated content" and "Unblock" to the table to determine that updating based on a parental control instruction of "unblocking PG-rated content" is associated with an age of ten. However, if the user had requested to "block PG-rated content," the age associated with updating based on that parental control instruction may be age two or have no age limit (or an age limit of zero).

In some embodiments, the media guidance application may compare the first parental control level with the second parental control level already set at the media device. The media guidance application may determine whether the age associated with the second parental control level exceeds the age associated with the first parental control level. For example, the media guidance application may determine that the age associated with the second parental control level (which may be, for example, blocking all content with higher than a "PG-13" rating) is thirteen years old, and the age associated with the first parental control level, or ten, as discussed above. The media guidance application may determine that the age range corresponding to the user exceeds the age associated with updating the parental control setting from the second parental control level based on the first parental control instruction if the age associated with the second parental control level exceeds the age associated with the first parental control level. In this way, the media guidance application allows users to make changes to the parental control setting at the media device in all situations where the setting is already higher than their age.

In some embodiments, the media guidance application may update the parental control setting at the media device from the second parental control level to the first parental control level if the age range exceeds the age associated with updating the parental control setting from the second parental control level based on the first parental control instruction. For example, if the media guidance application determines that the age range of twelve to sixteen, which corresponds to the user, exceeds the age associated with updating the parental control setting from blocking all programming that is rated higher than "G" to unblocking "PG-rated" content, which may be ten, the media guidance application may update the parental control setting at the media device to blocking all programming that is rated higher than "PG-rated" and thus unblock "PG-rated" content. In some embodiments, the media guidance application may notify the user that the parental control setting at the media device will be updated to the first parental control level. For example, the media guidance application may generate a prompt for display on a display device, or the media guidance application may generate a verbal notification for issuance from the display device, speakers, or the voice-based input device.

In some embodiments, the media guidance application may receive an audio input of a second user authorized to change the second parental control level to the first parental control level on the media device. For example, the media guidance application may receive an audio input of a parent saying "No, don't!" The media guidance application may determine that the second user is authorized to change the second parental control to the first parental control level by analyzing age in a similar manner to as described above. As another example, the media guidance application may have a profile of users who can always change the parental control settings, and compare the voice signature of the audio input to the profile of users to determine that there is a match. In some embodiments, the media guidance application may process the audio input of the second user to determine that the audio input of the second user includes an instruction negating the first parental control instruction. For example, the media guidance application may determine that the audio input of the parent saying "No, don't!" is an instruction negating the user's instruction to "unblock PG-rated content" at the media device. In some embodiments, the media guidance application may revert the parental control setting at the media device from the first parental control level back to the second parental control level based on determining that the audio input of the second user includes the instruction negating the first parental control instruction. For example, in response to determining that "No, don't!" negates the user's instruction to "unblock PG-rated content," the media guidance application may revert the parental control setting from "blocking all content rated higher than PG-rated" back to "blocking all content rated higher than G-rated."

In some embodiments, subsequent to updating the parental control setting at the media device, the media guidance application may receive an audio input of a second plurality of words. For example, the first parental control instruction may have been to block R-rated content, which may be associated with an age of ten years old from a user associated with an age range of twelve to sixteen years old. The media guidance application may subsequently receive an audio input from the voice-based input device. For example, the media guidance application may receive an audio input of the user saying "Unblock R-rated content" subsequent to receiving the audio input of the user saying "Block R-rated content." In some embodiments, the media guidance application may determine a second parental control instruction associated with the second plurality of words. For example, the second parental control instruction may be to "unblock R-rated content." The second parental control instruction may be of the same type as the first parental control instruction. A "type" of parental control instruction refers to the type of permissions the user is changing, for example, blocking/unblocking certain MPAA ratings, television ratings, or video game ratings, changing purchasing permissions, or any other suitable parental control setting. For example, the first parental control instruction and the second parental control instruction were both to change the settings related to MPAA ratings. The second parental control instruction comprises a third parental control level: for example, the third parental control level may be "PG-13" as unblocking R-rated content changes the setting from "block all programs rated higher than R-rated" to "block all programs rated higher than PG-13 rated."

In some embodiments, the media guidance application may compare the second parental control instruction to the first parental control instruction to determine that the second parental control instruction and the first parental control instruction are of the same type. For example, the media guidance application may compare data structures of the first and second parental control instructions to determine that both are of the type "updating settings related to MPAA ratings." In some embodiments, the media guidance application may compare an age range associated with the audio input of the second plurality of words, which may be determined in a similar manner as described above, with the age range of the user to determine that the age range associated with the audio input of the second plurality of words is the same or exceeds the age range of the user. For example, if the same user input the first parental control instruction and the second, the media guidance application may determine that both instructions are associated with the age range of twelve to sixteen years old. If the second audio input is input by another user that is in the twelve to sixteen years old age range, or the sixteen to seventeen years old age range, then the media guidance application determines that the age range associated with the second audio input exceeds or is the same as the age range of the user.

In some embodiments, the media guidance application may, based on determining that the second parental control instruction and the first parental control instruction are both of the first parental control type, and that the age range associated with the audio input of the second plurality of words is the same or exceeds the age range of the user, update the parental control setting at the media device from the first parental control level to the third parental control level. For example, the media guidance application may update the parental control level from "block all programs rated higher than R-rated" to "block all programs rated higher than PG-13 rated." In this way, if a user who is too young to unblock certain programming wants to block the programming from, say, a younger sibling, but then watch programming of that type later, he or she can do so.

In some embodiments, the media guidance application may maintain the parental control level at the media device based on determining that the age range does not exceed the age associated with updating the parental control setting from the second parental control level based on the first parental control instruction. For example, if the user was instead associated with an age range of three to seven, and tried to unblock PG-rated content, which is associated with an age of ten, the media guidance application may maintain the parental control level of "blocking all content rated higher than G-rated." In some embodiments, the media guidance application may notify the user that the second parental control level will be maintained. For example, the media guidance application may generate a prompt for display on a display device, or the media guidance application may generate a verbal notification for issuance from the display device, speakers, or the voice-based input device.

In some embodiments, the media guidance application may receive an audio input of a second user authorized to change the second parental control level to the first parental control level on the media device. For example, the media guidance application may receive an audio input of a parent saying "It's ok!" The media guidance application may determine that the second user is authorized to change the second parental control to the first parental control level similar to as described above. In some embodiments, the media guidance application may process the audio input of the second user to determine that the audio input of the second user includes an instruction affirming the first parental control instruction. For example, the media guidance application may determine that the audio input of the parent saying "It's ok!" is an instruction affirming the user's instruction to "unblock PG-rated content" at the media device. In some embodiments, the media guidance application may update the parental control setting at the media device from the second parental control level to the first parental control level based on determining that the audio input of the second user includes the instruction affirming the first parental control instruction. For example, in response to determining that "It's ok!" affirms the user's instruction to "unblock PG-rated content," the media guidance application may change the parental control setting from "blocking all content rated higher than G-rated" to "blocking all content rated higher than PG-rated," by unblocking content that is PG-rated.

The described systems and methods can control permission of who can change parental control settings on a media device based solely on the vocal characteristics of the user and without further user input. Conventional systems, while allowing users to use voice commands to update the parental control settings, might allow any user to update the parental control settings, require users to input passwords, or require time-consuming profile set-ups where profiles could be set up that indicated who could update parental control settings. These time-consuming processes could leave users annoyed with the amount of time it took to change permissions or control who could change permissions, or if they forgot their password, without a way to change the parental control permissions. Users may therefore not use this feature, allowing children to access inappropriate content while the parent was not observing them. The past conventional systems did not appreciate using vocal characteristics and audio analysis to determine an age of the user, which could be used to determine what parental controls the user may be able to update. The described systems and methods, by processing the audio input from the user to change the parental control setting and comparing that age to an age required to make the change, will eliminate the need for a user, particularly for a parent, to have to go through time-consuming processes of setting up passwords or controlling permissions as to who can make changes to what parental control settings. Thus, the systems and methods allow for an accurate determination of the appropriateness of a user in changing the parental control settings at a media device, while eliminating the need for the parent to go through the time-consuming process of inputting all of that data themselves. The described systems and methods additionally describe adapting what inputs are accepted based on past inputs and based on other users affirming the changes requested by the original user who input the audio input, which allows for an even more accurate determination, and even personalization, of what may be appropriate parental control settings the user can make.

It should be noted the systems and/or methods described above may be applied to, or used in accordance with, other systems, methods and/or apparatuses described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative example of a graphical representation of a table associating parental control levels and parental control update commands with ages, in accordance with some embodiments of the disclosure;

FIG. 4 shows an illustrative example of a graphical representation of a data structure in a voice database, in accordance with some embodiments of the disclosure;

DETAILED DESCRIPTION

Figure 1:
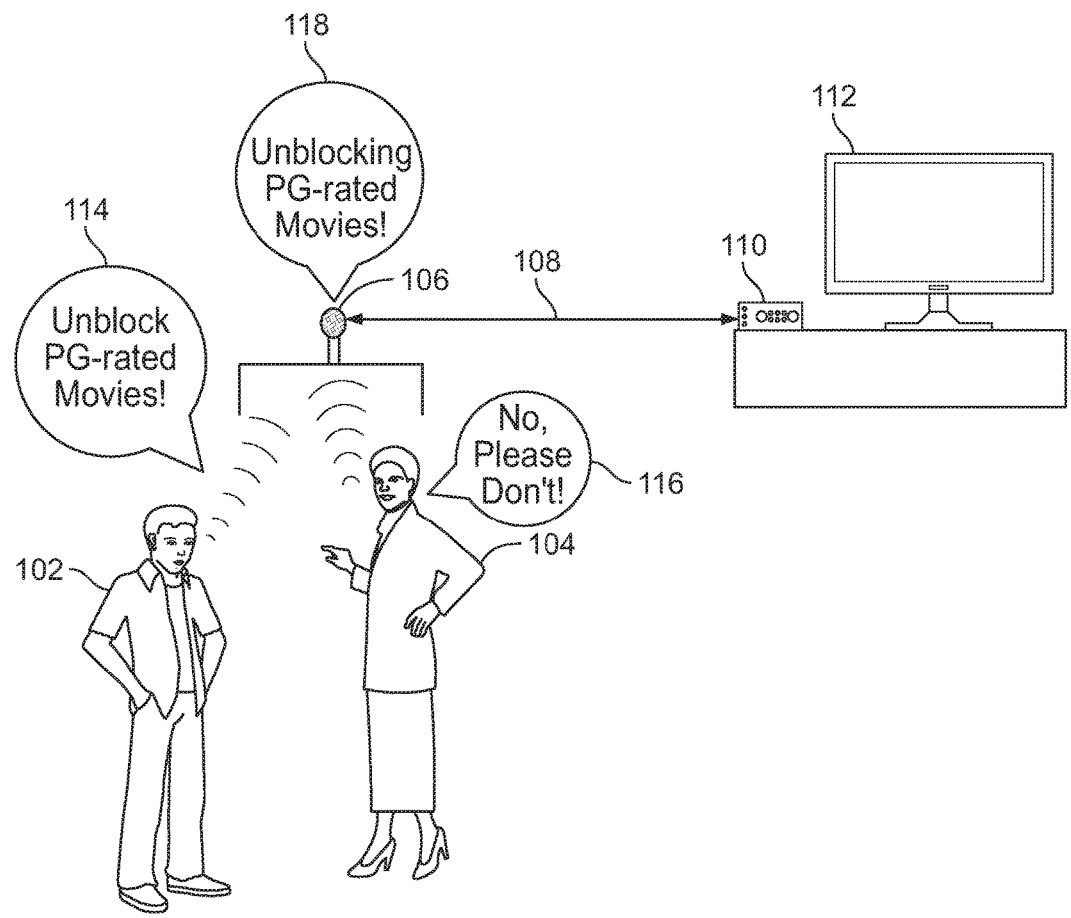
FIG. 1 shows an illustrative example of a media guidance application receiving an audio input and controlling the parental control settings at a media device based on the vocal characteristics of the user, in accordance with some embodiments of the disclosure.

Systems and methods are described herein for controlling permissions to change parental control settings based on vocal characteristics of a user. These systems and methods may be implemented by a media guidance application (e.g., executed by user equipment associated with the user). In some aspects, the media guidance application may receive a voice command from a user to update a parental control setting. The media guidance application may determine both what the requested change is and an age (or age range) of the user who is attempting to change the parental control setting based on vocal characteristics of the voice command. If the media guidance application determines that an age range associated with the user exceeds the age associated with the requested change to the parental control setting, the media guidance application may update the parental control setting at a media device based on the requested change. In this way, the media guidance application may allow only users of appropriate ages to change parental control settings at the media device without a user having to indicate what users are allowed to change what settings.

For example, a user may utter a command (e.g., "Unblock R-rated movies") to a voice-based input device. The media guidance application may receive the audio input of the utterance and parse the audio into a plurality of words, which may be compared to a command database to determine the audio input includes a parental control instruction (e.g., "Unblock" and "R-rated" may be found in the command database). The media guidance application may determine an age range corresponding to the user in the audio input based on vocal characteristics (e.g., average word length, mean fundamental frequency, or speaking rate) of the user. If the age range corresponding to the user exceeds the age associated with parental control instruction (e.g., unblocking R-rated programs may be associated with an age of 18), the parental control setting is updated at the device based on the parental control instruction (e.g., R-rated programs will be unblocked).

The media guidance application may receive, from a voice-based input device, an audio input of an utterance of a user, for example, the user saying "Unblock PG-13 programs," and parse the audio input into a plurality of words (e.g., "Unblock," "PG-13," and "programs"). The media guidance application may compare some of the parsed words (e.g., "Unblock" and "PG-13") to a command database to determine whether they correspond to an entry in the command database, indicating that the audio input of the utterance of the user was an instruction regarding parental controls. If the media guidance application determines that the words correspond to the entry, the media guidance application may access the entry to determine the parental control instruction (e.g., "Unblock PG-13-rated media content) including a parental control level ("PG-13-rated").

The media guidance application may further process the audio input to determine vocal characteristics of the user, such as their speaking rate, mean fundamental frequency, and average word duration. These characteristics may be indicative of the age of the user. The media guidance application may compare the vocal characteristics to a voice database that aids the media guidance application in determining the age range of the user. For example, the media guidance application may determine that the user is between 16 and 20 years old based on the comparison. The voice database may be populated by sampling vocal characteristics of a plurality of users who input their age into their media guidance applications, and then, using those samples, determine average signatures for each vocal characteristic and age pair. In this way, when the vocal characteristics of the user are compared to the vocal characteristics in the voice database, they can be compared to the average signatures to find the closest signature, and thus determine the age of the user.

Furthermore, each vocal characteristic and age pair may have a weight associated with them, which may indicate how deterministic the vocal characteristic is of the age or age range (which may be associated with a deviation of the voice samples from the average signature or some other regression technique). The media guidance application may sum the weights for all vocal characteristics that correlate to a specific age range, and then determine which age range has the greatest sum. For example, the media guidance application may determine that the age range of 16 to 20 years old may have a sum of 1.5 whereas the age range of six to 12 years old may only have a sum of 0.2. The age range of 16 to 20 years old may be used as the age range for the user because it has the greater sum. However, if the sums for multiple age ranges exceed a threshold, that is, if the sum for six to 12 years old had been 1.3 or 1.4 and the threshold was 1.2, the media guidance application may determine that there is too much uncertainty in the age of the user, and thus determine that the age range should be the null set, which means that the user should not be authorized to make any updates to the parental control settings on the media device as his or her age could not be determined. In the alternative, the age range may be set to 0, such that the user may be allowed to make certain updates that don't require a minimum age.

The media guidance application may determine what the current parental control level at the media device is. The media guidance application may compare an age range corresponding to the user (e.g., 16 to 20 years old) to an age associated with updating the parental control setting from the second parental control level based on the first parental control instruction. For example, any update related to the PG-13-rating parental control level may be associated with an age of 13. In some embodiments, the media guidance application may determine that the age of 13 is associated with the PG-13-rating based on a table associating parental control instructions with a plurality of ages and comparing the parental control level (e.g., PG-13-ratings) to the table. In some embodiments, the media guidance application may additionally determine a parental control update command (e.g., "Unblock") included in the audio input as part of determining the parental control instruction, and may further compare the parental control update command to the table. For example, unblocking PG-13-rated content may be associated with an age of 13, but blocking PG-13-rated content may be associated with a lower age, such as five years old. Furthermore, the media guidance application may also compare the parental control level on the media device with the requested parental control level. For example, if the user is requesting to unblock PG-13-rated content, but R-rated movies are already unblocked, then the media guidance application may allow the update to occur regardless of the age range of the user.

The media guidance application may update the parental control setting at the media device from the parental control level (e.g., allowing PG-rated (or less) media content) at the media device to the first parental control level (e.g., allowing PG-13-rated (or less) media content) if the age range exceeds the age associated with updating the parental control level at the media device based on the first parental control instruction. However, if the age range does not exceed the age, then the media guidance application may maintain the parental control level (e.g., allowing PG-rated (or less) media content) at the media device and not update the parental control level. In either case, an authorized user (such as the parent) may respond to a notification that the parental control level at the media device will be updated/maintained. For example, the media guidance application may notify the user that the parental control level will be updated from PG-rating to PG-13 rating and the authorized user may say, "No, don't!" Based on determining that this command negates the previous command, the media guidance application may revert the parental control setting to the original parental control level at the media device. Similarly, if the media guidance application notifies the authorized user that the parental control setting of PG-rating is to be maintained, the authorized user may say "It's ok!" Based on determining that this command affirms the previous command, the media guidance application may update the parental control setting to PG-13-rating.

Finally, the media guidance application may receive a subsequent command and treat this command differently if the command is changing the same parental control setting of a particular type (e.g., a type may be updating ratings or updating how much the user is allowed to spend on purchased programming). For example, if the user, who may have an age range of 12-16, had requested to block R-rated programming, which may be associated with an age of 10, the media guidance application may update the parental control setting. That same user, or a user associated with an age range of 16-17, may later request to unblock R-rated programming, which may be associated with an age of 18. Normally, neither user may be able to unblock R-rated programming. However, based on determining that the second request (to unblock R-rated programming) is of the same type as the first request (to block R-rated programming) and that the user issuing the second request is the same age or older than the user who issued the first request, the media guidance application may allow this update to occur.

FIG. 1 shows an illustrative example of a media guidance application receiving an audio input and controlling the parental control settings at a media device based on the vocal characteristics of the user, in accordance with some embodiments of the disclosure. For example, user 102 may say utterance 114 to instruct voice-based input device 106 to unblock PG-rated movies. Voice-based input device 106 may communicate the audio input of utterance 114 or the instruction to media device 110 via communications link 108, which may be connected to display 112. In response to utterance 114, voice-based input device 118 may issue notification 118. In response to notification 118, user 104 may say utterance 116.

In some embodiments, a media guidance application, for example, implemented on media device 110 may receive, from voice-based input device 106, an audio input of utterance 114 of user 102. For example, the media guidance application may receive, over communication link 108 from voice-based input device 106, an audio input of utterance 114 of user 102 saying "Unblock PG-rated movies." In some embodiments, the media guidance application may, based on receiving the audio input over communications link 108 from voice-based input device 106, parse the audio input into a first plurality of words (e.g., "Unblock," "PG-rated," and "Movies"). In some embodiments, the media guidance application may run a natural language understanding sub-process locally to convert the audio input into a string of words. In other embodiments, the media guidance application may transmit the audio input to a server or other dedicated processor to parse the audio input.

In some embodiments, the media guidance application, which may be implemented on media device 110, may compare a first subset of the first plurality of words corresponding to utterance 114 of user 102 to a command database to determine that the first subset of the first plurality of words corresponds to a command entry in the command database. For example, the media guidance application may retrieve a data structure or table comprising a plurality of parental control update commands and a plurality of parental control levels. For example, the plurality of parental control update commands may be "Unblock," "Block," "Allow," and "Prevent." The plurality of parental control levels may be "G," "PG," "PG-13," "R," "Violence," "Language," "Sexual content," "Nudity," "Purchasing," "Purchasing+ [monetary value]" "TV-G," "TV-PG," "TV-14," "TV-MA," "E," "E-10-Plus," "T," and "M." The media guidance application may determine that "PG-rated" (a first subset of utterance 114 of user 102) relates to the same parental control level in the command database. The media guidance application may therefore determine that the audio input comprises a parental control instruction. In some embodiments, the media guidance application may also compare a second subset of the first plurality of words to the command database to determine a first parental control update command. For example, the media guidance application may determine that "Unblock" (a second subset of the words of utterance 114 of user 102) corresponds to the same parental control update command in the command database as described above.

In some embodiments, the media guidance application, which may be implemented on media device 110, may, based on determining that the first subset corresponds to the command entry in the command database, access the command entry corresponding to the first subset. For example, the media guidance application may query the command database for the command entry corresponding to the "PG" or corresponding to both "Unblock" and "PG." The media guidance application may receive, in response, the command entry. In some embodiments, the media guidance application may extract, from the command entry, a first parental control instruction corresponding to the audio input of utterance 114 of user 102. The first parental control instruction may comprise a first parental control level. In some embodiments, the first parental control instruction may also comprise a first parental control update command. For example, the media guidance application may extract, by executing an SQL script utilizing the declarative "Select" command, from the command entry, the first parental control instruction to "unblock PG-13 rated content" associated with the audio input of utterance 114 of user 102.

In some embodiments, the media guidance application, which may be implemented on media device 110, may process the audio input of utterance 114 of user 102, using an audio input analysis process, to determine a plurality of vocal characteristics of user 102. In some embodiments, the media guidance application may run the audio input analysis process locally to determine the plurality of vocal characteristics. In other embodiments, the media guidance application may transmit the audio input to a server or other dedicated processor to determine the plurality of vocal characteristics. For example, the media guidance application may determine that the audio input of utterance 114 of user 102 has a speaking rate of 3.3 words per second, a mean fundamental frequency of 330 Hertz (Hz), and an average word duration of 45 milliseconds (ms).

In some embodiments, the media guidance application may compare the plurality of vocal characteristics of utterance 114 of user 102 to a voice database associating vocal characteristics of user 102 with a plurality of age ranges. For example, the media guidance application may access a table that associates vocal characteristics with a plurality of age ranges. In some embodiments, the media guidance application may, based on the comparison of the plurality of vocal characteristics of user 102 to the voice database, an age range corresponding to user 102. For example, the media guidance application may determine that the age range corresponding to user 102 is twelve to sixteen based on the comparison of the user's vocal characteristics with the voice database. More details on the voice database are provided below in relation to FIG. 4.

In some embodiments, the media guidance application, which may be implemented on user device 110, may query memory of user device 110 for a second parental control level, where the second parental control level is a parental control setting at a media device. For example, the media guidance application may access, from memory of user device 110, that the parental control level at media device 110 is blocking all programming that is rated higher than "G." In some embodiments, the media guidance application may compare the age range corresponding to user 102 to an age associated with updating the parental control setting from the second parental control level based on the first parental control instruction to determine whether the age range corresponding to the user exceeds the age associated with updating the parental control setting from the second parental control level based on the first parental control instruction. For example, the media guidance application may determine that the age range of twelve to sixteen, which corresponds to the user, exceeds the age associated with updating the parental control setting from blocking all programming that is rated higher than "G" to unblocking "PG-rated" content, which may be ten years old. More details relating to comparing the age range and the age associated with updating and determining the age range are presented below in relation to FIG. 3.

In some embodiments, the media guidance application may update the parental control setting at media device 110 from the second parental control level to the first parental control level if the age range of user 102 exceeds the age associated with updating the parental control setting from the second parental control level based on the first parental control instruction as determined from the audio input of utterance 114 of user 102. For example, if the media guidance application determines that the age range of twelve to sixteen, which corresponds to user 102, exceeds the age associated with updating the parental control setting from blocking all programming that is rated higher than "G" to unblocking "PG-rated" content, which may be ten, the media guidance application may update the parental control setting at media device 110 to blocking all programming that is rated higher than "PG-rated" and thus unblock "PG-rated" content. In some embodiments, the media guidance application may notify user 102 that the parental control setting at media device 102 will be updated to the first parental control level. For example, the media guidance application may generate notification 116 for issuance from voice-based input device 106.

In some embodiments, the media guidance application, which may be implemented on media device 110, may receive an audio input of utterance 116 of user 104, who may be authorized to change the second parental control level to the first parental control level on media device 110. For example, the media guidance application may receive an audio input of utterance 116 of user 104 (e.g., user 104 saying "No, please don't!"), who may be the parent of user 102. The media guidance application may determine that user 104 is authorized to change the second parental control to the first parental control level at media device 110 by analyzing their age in a similar manner to the method described above. As another example, the media guidance application may have a profile of users (e.g., user 104's and user 102's other parent) who can always change the parental control settings at media device 110, and compare the voice signature of the audio input of utterance 116 to the profile of users to determine that there is a match. In some embodiments, the media guidance application may process the audio input of utterance 116 of user 104 to determine that the audio input of utterance 116 of user 104 includes an instruction negating the first parental control instruction contained in utterance 114 of user 102. For example, the media guidance application may determine that the audio input of utterance 116 of user 104 (e.g., user 104 saying "No, please don't!") is an instruction negating user 102's instruction in utterance 114 to "unblock PG-rated content" at media device 110. In some embodiments, the media guidance application may revert the parental control setting at media device 110 from the first parental control level back to the second parental control level based on determining that the audio input of utterance 116 of user 104 includes the instruction negating the first parental control instruction received from user 102. For example, in response to determining that "No, please don't!" negates the user 102's instruction in utterance 114 to "unblock PG-rated content," the media guidance application may revert the parental control setting at media device 110 from "blocking all content rated higher than PG-rated" back to "blocking all content rated higher than G-rated."

Instead of immediately updating the parental control setting at media device 110, the media guidance application may store, at voice-based input device 106, the updated parental control setting. For example, the media guidance application may receive a parental control instruction from user 104 (e.g., an audio input from user 104) instructing the media guidance application to allow access to R-rated films for one hour. Once the media guidance application determines that the user is allowed to make such an update (e.g., using the process described above), the media guidance application may store, at voice-based input device 106, updated parental control instruction, that is, unblocking access to R-rated content for one hour. The parental control setting at media device 110 may therefore remain as blocking all access to content rated R-rated or higher. If user 102 requests to watch an R-rated program within the next hour at media device 110, media device may query voice-based input device 106 over communications link 108 for an updated parental control setting. In this way, voice-based input device 106 may act as the authoritative device, and media device 110 may be a follower device, where the voice-based input device may have the power to override settings at the media device 110. In some embodiments, the media guidance application may always have to check with voice-based input device 106 for settings such as parental control settings.

In some embodiments, the media guidance application may block access to content, on media device 110, based on the parental control setting. For example, the media guidance application may access the parental control setting and compare the parental control setting to metadata associated with requested content. However, in some instances, metadata associated with the requested content may be unavailable, such as online video content or live broadcast programming, or may be out-of-date. The media guidance application may use voice-based input device 110 to determine a rating for the requested content. For example, the media guidance application may receive, from voice-based input device 110, an audio input of the requested content. The media guidance application may compare the audio input to a program audio signature database to determine if there is a match. If there is a match, the media guidance application may receive, from the program audio signature database, metadata relating to the requested content. For example, if user 102 is watching online video content (which may have no metadata relating to the parental control rating) on display 112, the media guidance application may receive, from voice-based input device 110, an audio clip that contains the line "I'll be back." The media guidance application may compare this audio clip to the program audio signature database to determine that the online video is a clip from "Terminator." The media guidance application may then receive, from the program audio signature database, metadata relating to the film "Terminator," and associate that metadata with the online video content, and control access to the online video content according to the parental control rating for terminator.

In some embodiments, the media guidance application may not be able to determine that the requested content is associated with a program that has metadata associated therewith. In some embodiments, the media guidance application may use voice-based input device 106 to monitor the requested content to determine a plurality of audio inputs. The media guidance application may compare each of the plurality of audio inputs to a rating database to determine if any of the plurality of audio inputs comprise explicit language, or audio signatures that match with audio signatures for violent content or sexually explicit content. In this way, the media guidance application may be able to determine if there is explicit content that warrants updating the rating of the requested content. The media guidance application may thereafter update the metadata for the requested content based on the comparison of the plurality of audio inputs to the ratings database. In some embodiments, the media guidance application may transmit, to a database, the updated metadata to ensure that the database has the most up-to-date metadata regarding the requested program.

Figure 2:
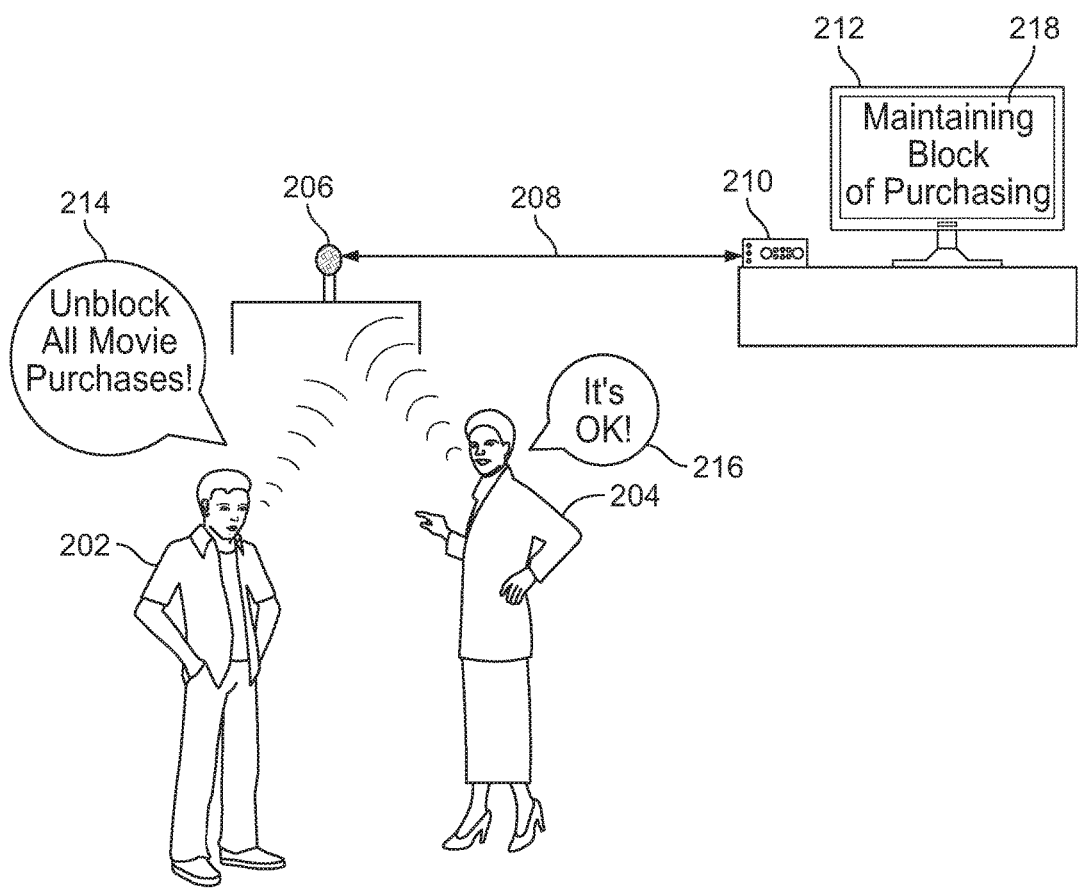
FIG. 2 shows another illustrative example of a media guidance application receiving an audio input and controlling the parental control settings at a media device based on the vocal characteristics of the user, in accordance with some embodiments of the disclosure.

FIG. 2 shows another illustrative example of a media guidance application receiving an audio input and controlling the parental control settings at a media device based on the vocal characteristics of the user, in accordance with some embodiments of the disclosure. For example, user 202 may say utterance 214 to instruct voice-based input device 206 to unblock all movie purchases. Voice-based input device 206 may communicate the audio input of utterance 214 or the instruction to media device 210 via communications link 208, which may be connected to display 212. In response to utterance 214, media device 110 may generate for display, on display 212, notification 218. In response to notification 218, user 204 may say utterance 216. In some embodiments, a media guidance application, which may be implemented on media device 210, may process an audio input of utterance 214 of user 202, received over communication link 208 from voice-based input device 206, in a similar manner to as described above to determine both an age range for user 202 based on the vocal characteristics of user 202 and based on comparing the words of the audio input of utterance 214 of user 202 to the command database. The media guidance application may determine that the age range of user 202 is twelve to sixteen, and may determine that the age associated with unblocking all movie purchases, the parental control instruction associated with the audio input of utterance 214 of user 202 received at voice-based input device 206, is seventeen. The media guidance application may compare the age range of twelve to sixteen to the age associated with the parental control instruction to determine that the age range associated with user 202 does not exceed the age associated with the parental control instruction.

In some embodiments, the media guidance application may maintain the parental control level at media device 210 based on determining that the age range associated with user 202 does not exceed the age associated with updating the parental control setting from a parental control level already set at media device 210 based on the parental control instruction contained in utterance 214 of user 102. For example, because updating the parental control level of "blocking all purchases" to "allowing all purchases" on media device 210 is associated with an age of seventeen, and user 210 is in an age range of twelve to sixteen, the media guidance application may maintain the parental control level of "blocking all purchases" on media device 210. In some embodiments, the media guidance application may notify user 202, with notification 218, that the second parental control level will be maintained at media device 210. For example, the media guidance application may generate notification 218 for display on display 212.

In some embodiments, the media guidance application, which may be implemented on media device 210, may receive an audio input of utterance 216 of user 204 (e.g., "It's ok") authorized to change the second parental control level to the first parental control level on media device 210. The media guidance application may determine that user 204 is authorized to change the second parental control to the first parental control level in a similar manner to that described above. In some embodiments, the media guidance application may process the audio input of utterance 216 of user 204 to determine that the audio input of utterance 216 of user 204 includes an instruction affirming the first parental control instruction. For example, the media guidance application may determine that the audio input of utterance 216 of user 204 (e.g., "It's ok") is an instruction affirming user 202's instruction in utterance 214 to "unblock all purchasing" at media device 210. In some embodiments, the media guidance application may update the parental control setting at media device 210 from the second parental control level (e.g., "blocking all purchases") to the first parental control level ("allowing all purchases") based on determining that the audio input of utterance 216 of user 204 includes the instruction affirming the first parental control instruction received from user 202. For example, in response to determining that "It's ok!" affirms the user 202's instruction in utterance 214 to "unblock all purchases," the media guidance application may change the parental control setting from "blocking all purchases" to "allowing all purchases" by unblocking all purchasing at media device 210.

FIG. 3 shows an illustrative example of a graphical representation of a table associating parental control levels and parental control update commands with ages, in accordance with some embodiments of the disclosure. Table 302 may associate parental control levels 304 and parental control update commands 306 with ages 308. A media guidance application may use table 302 to help determine an age associated with updating a parental control setting at a media device from the parental control level on the media device based on a parental control instruction comprising a parental control level of parental control levels 304 and a parental control update command of parental control update commands 306.

In some embodiments, the media guidance application may determine the age associated with updating the parental control setting from the parental control level on the media device based on the parental control instruction comprising the parental control level of parental control level 304 and the parental control update command of parental control update commands 306 by transmitting, to a parental control database, a request for table 304 and may receive, from the parental control database, a data packet containing table 302. In some embodiments, the media guidance application may compare the parental control level of parental control level 304, which may be the first parental control level of the parental control instruction associated with audio input of utterance 114 of user 102 in FIG. 1, with table 302 to determine an age of ages 308 associated with updating the parental control setting. For example, the media guidance application may compare a parental control level of "PG-rated content" with parental control levels 302 of table 302 to determine that updating based on a parental control instruction associated with a parental control level of "PG-rated content" is associated with an age of ten of ages 308. In some embodiments, the media guidance application may further compare a parental control update command with parental control update commands 306 of table 302 to determine an age range associated with both the parental control level of parental control level 304 and the parental control update command of parental control update commands 306 to determine the age associated with updating the parental control setting from the parental control level at the media device based on the parental control instruction comprising the parental control level of parental control level 304 and the parental control update command of parental control update commands 306. For example, the media guidance application may compare a parental control level of "PG-rated content" to parental control levels 304 of table 302 and a parental control update command of "Unblock" to parental control update commands 306 of table 302 to determine that updating based on a parental control instruction of "unblocking PG-rated content" is associated with an age of ten of ages 308. However, if the user had requested to "block PG-rated content," the age of ages 308 associated with updating based on that parental control instruction may be 0, or may not have a minimum age.

In some embodiments, the media guidance application may update the parental control setting at the media device from the parental control level already on the media device to the parental control level of parental control levels 304 if the age range exceeds the age of ages 308. Note however, that table 302 informs only an age of ages 308 associated with the parental control instruction comprising the parental control level of parental control level 304 and the parental control update command of parental control update commands 306, but the age of updating from the parental control level at the media device based on the parental control instruction may be different than simply the age of ages 308, or some updates may be allowed even if the user may not normally have permissions to make the update they wish to make. In some embodiments, the media guidance application may compare the parental control level of parental control levels 304 with the parental control level already set at the media device. The media guidance application may determine whether the age associated with the parental control level at the media device exceeds the age of ages 308 (e.g., ten). For example, the media guidance application may determine that the age associated with the parental control level already set at the media device (which may be, for example, blocking all content with an R-rating or higher) is eighteen years old based on table 302, and the age of ages 308 associated with the parental control level of parental control level 304 is ten, and based on determining that the age of ages 308 associated with the parental control level of parental control level 304 is less than the parental control level already on the media device, that this update is always allowed. In this way, the media guidance application allows users to make changes to the parental control setting at the media device in all situations where the setting is associated with a higher age than the age associated with their request despite their age.

In some embodiments, subsequent to updating the parental control setting at the media device to the parental control level of parental control level 304, the media guidance application may receive an audio input of a plurality of words. For example, the parental control instruction comprising the parental control level of parental control level 304 and the parental control update command of parental control update commands 306 may have been to "block R-rated content," which may be associated with an age of ages 308 of ten years old from a user associated with an age range of twelve to sixteen years old. The media guidance application may subsequently receive an audio input from the voice-based input device (e.g., voice-based input device 110 of FIG. 1). For example, the media guidance application may receive an audio input of the user saying "Unblock R-rated content" subsequent to receiving the audio input of the user saying "Block R-rated content." In some embodiments, the media guidance application may determine a second parental control instruction associated with the second plurality of words. For example, the second parental control instruction comprising a second parental control level of parental control levels 304 and a second parental control update command of parental control update commands 306 may be to "unblock R-rated content." The second parental control instruction may be of the same type as the first parental control instruction. A "type" of parental control instruction refers to the type of permissions the user is changing, for example, blocking/unblocking certain MPAA ratings, television ratings, or video game ratings, changing purchasing permissions, or any other suitable parental control setting. For example, the first parental control instruction and the second parental control instruction were both to change the settings related to MPAA ratings.

In some embodiments, the media guidance application may compare the second parental control instruction (e.g., "Unblock R-rated movies") to the first parental control instruction (e.g., "Block R-rated movies") to determine that the second parental control instruction and the first parental control instruction are of the same type. For example, the media guidance application may compare data structures of the first and second parental control instructions to determine that both are of the type "updating settings related to MPAA ratings." In some embodiments, the media guidance application may compare an age range associated with the audio input of the second plurality of words, which may be determined in a similar manner as described above, with the age range of the user to determine that the age range associated with the audio input of the second plurality of words is the same or exceeds the age range of the user. For example, if the same user input the first parental control instruction and the second, the media guidance application may determine that both instructions are associated with the age range of twelve to sixteen years old. If the second audio input is input by another user that is in the twelve to sixteen years old age range, or the sixteen to seventeen years old age range, then the media guidance application determines that the age range associated with the second audio input exceeds or is the same as the age range of the user.

In some embodiments, the media guidance application may, based on determining that the second parental control instruction and the first parental control instruction are both of the first parental control type, and that the age range associated with the audio input of the second plurality of words is the same or exceeds the age range of the user, update the parental control setting at the media device from the parental control level of parental control levels 304 to the second parental control level of parental control levels 304. For example, the media guidance application may update the parental control level from "block all programs rated higher than R-rated" to "block all programs rated higher than PG-13 rated." In this way, if a user who is too young to unblock certain programming wants to block the programming from, say, a younger sibling, but then watch programming of that type later, they can do so.

FIG. 4 shows an illustrative example of a graphical representation of a data structure in a voice database, in accordance with some embodiments of the disclosure. Table 402 may associate vocal characteristics 404, such as speaking rates 410, mean fundamental frequencies 412, and average word durations 414 with age ranges 406 and weights 408. Weights 408 may signify a relative confidence or relative correlation between vocal characteristics 404 and their respective age range of age ranges 406. In some embodiments, the media guidance application may use table 402 to determine an age range associated with a user, using a plurality of vocal characteristics in an audio input (e.g., the audio input of utterance 114 of user 102 in FIG. 1). For example, the media guidance application may access table 402 based on receiving the audio input.

Table 402 may associate speaking rates 410 with age ranges 406; for example, a speaking rate of greater than three words per second may be associated with an age range of greater than sixteen years old, a speaking rate of two to three words per second may be associated with an age range of twelve to sixteen years old, and a speaking rate of less than two words per second may be associated with an age range of three to twelve years old. Table 402 may further associate mean fundamental frequencies 412 with age ranges 406; for example, a mean fundamental frequency of less than 170 Hertz for a male speaker may be associated with an age range of greater than sixteen years old, a mean fundamental frequency of between 170 and 250 Hertz for a female speaker may be associated with an age range of greater than sixteen years old, a mean fundamental frequency of between 250 and 350 Hertz for a female or male speaker may be associated with an age range of between twelve and sixteen years old, and a mean fundamental frequency of greater than 350 Hertz for a female or male speaker may be associated with an age range of between three and twelve years old. Finally, table 402 may associate average word duration with age ranges 406, for example, an average word duration of less than 25 milliseconds may be associated with an age range of greater than sixteen years old, a average word duration of between 25 and 50 milliseconds may be associated with an age range of between twelve and sixteen years old, and a average word duration of greater than 50 milliseconds may be associated with an age range of between three and twelve years old. One of ordinary skill in the art would understand that other vocal characteristics may be used, and that the chosen speaking rates 410, mean fundamental frequencies 412, and average word durations 414, and their associated age ranges 406 and weights 408 were chosen merely as examples, and that other appropriate speaking rates, mean fundamental frequencies, and average word durations may be associated with different age ranges and weights.

In some embodiments, the media guidance application may create table 402 for storage in the voice database using crowdsourced data. For example, the media guidance application may receive, from a plurality of media devices, a plurality of data structures. The plurality of data structures may comprise a plurality of audio inputs and a plurality of ages of a plurality of users, each data structure containing a respective audio input associated with an age of a respective user speaking in the respective audio input. For example, the media guidance application may receive three data structures from three media devices. The first may contain a first audio input from a sixteen-year-old user, the second may contain a second audio input from a thirteen-year-old user, and the third may contain a third audio input from a nine-year-old user.

In some embodiments, the media guidance application may process the plurality of audio inputs to determine a plurality of sets of vocal characteristics. For example, the media guidance application may process the first data structure to determine that the first audio input has a speaking rate of 2.7 words per second, a mean fundamental frequency of 270 Hertz, and an average word duration of 40 milliseconds. The media guidance application may process the second data structure to determine that the second audio input has a speaking rate of 2.3 words per second, a mean fundamental frequency of 330 Hertz, and an average word duration of 35 milliseconds. The media guidance application may process the third data structure to determine that the third audio input has a speaking rate of 3.5 words per second, a mean fundamental frequency of 400 Hertz, and an average word duration of 20 milliseconds. In some embodiments, the media guidance application may determine, for each vocal characteristic, an average signature associated with each age based on the plurality of sets of vocal characteristics to create a plurality of average signatures. For example, the media guidance application may determine, based on these audio inputs and additional audio inputs, vocal characteristics 404 and age ranges 406, and how such information should be paired. The media guidance application may then associate vocal characteristics 404 with age ranges 406 in table 402. For example, the media guidance application may associate the average audio signatures, which may comprise vocal characteristics 404 with the respective age, which may comprise age ranges 406, in table 402.

As discussed above, in some embodiments, the media guidance application may determine, based on the comparison of the plurality of vocal characteristics of the user to table 402, an age range of the plurality of age ranges corresponding to the user. For example, the media guidance application may determine that the age range corresponding to the user is twelve to sixteen based on the comparison of the user's vocal characteristics with the voice database. In some embodiments, the media guidance application may determine the age range of age ranges 406 corresponding to the user using a probability model. For example, the media guidance application may compare each of the plurality of vocal characteristics of the user to vocal characteristics 404 in table 402 to determine a plurality of age ranges 406 associated with the plurality of vocal characteristics of the user and a plurality of weights 408 associated with the plurality of vocal characteristics of the user. For example, the media guidance application may compare a speaking rate of 3.3 words per second to speaking rates 410 in table 402 to determine that it is associated with an age range of age ranges 406 of three to twelve and a weight of weights 408 of 0.5, a mean fundamental frequency of 330 Hertz to mean fundamental frequencies 412 in table 402 to determine that it is associated with an age range of age ranges 406 of twelve to sixteen and a weight of weights 408 of 0.5, and an average word duration of 45 milliseconds to average word durations 414 in table 402 to determine that it is associated with an age range of age ranges 406 of twelve to sixteen and with a weight of weights 408 of 0.9.

In some embodiments, the media guidance application may determine a plurality of sums. Each sum may be associated with a respective age range of age ranges 406, and calculated by summing weights associated with vocal characteristics 404 associated with the respective age range of age ranges 406. For example, the media guidance application may determine that the sum associated with the age range of age ranges 406 of twelve to sixteen is 1.4, and may determine that the sum associated with the age range of age ranges 406 of three to twelve is 0.5. In some embodiments, the media guidance application may determine the greatest sum of the plurality of sums. For example, the media guidance application may determine that the sum of 1.4 is the greatest sum. In some embodiments, the media guidance application may determine that the age range of age ranges 406 associated with the user is the age range of age ranges 406 associated with the greatest sum. For example, based on determining that 1.4 is the greatest sum, the media guidance application may determine that the age range of age ranges 406 of the user is twelve to sixteen.

In some embodiments, the media guidance application may determine that at least two of the plurality of sums exceed a threshold sum. For example, the media guidance application may instead determine that the sum for the age range of age ranges 406 of three to twelve is 1.2. The media guidance application may determine the threshold sum, which may be a predetermined number, or may be calculated based on the greatest sum (e.g., may be a certain percentage, such as 80%, of the greatest sum). The media guidance application may, based on determining that at least two of the plurality of sums exceed the threshold sum, determine that the age range is a null age range. For example, if the media guidance application may determine that the sums of 1.2 and 1.5 exceed the threshold sum of 1.0, and may therefore determine that the age range is a null age range, which may indicate that the media guidance application cannot determine the age range. Note that in embodiments where the age range is set to be the null age range, the media guidance application may determine that the age range corresponding to the user does not exceed any ages associated with updating a parental control setting from a parental control level currently set on a media device based on a parental control instruction received from a user, as described above in relation to FIG. 3.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
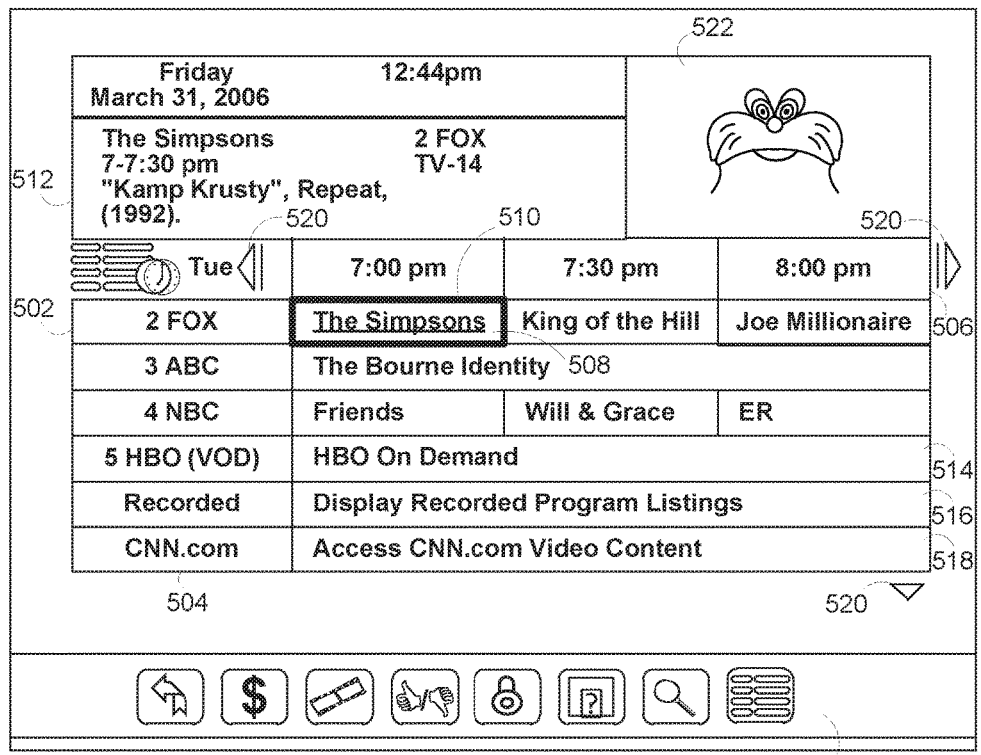
FIG. 5 shows an illustrative example of a display screen for use in accessing media content, in accordance with some embodiments of the disclosure.
Figure 6:
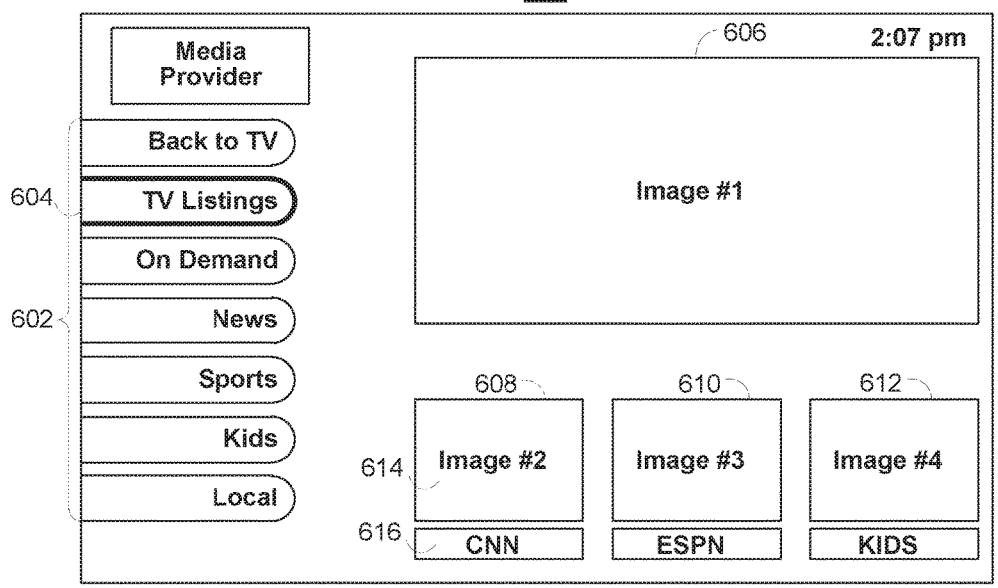
FIG. 6 shows another illustrative example of a display screen used in accessing media content, in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
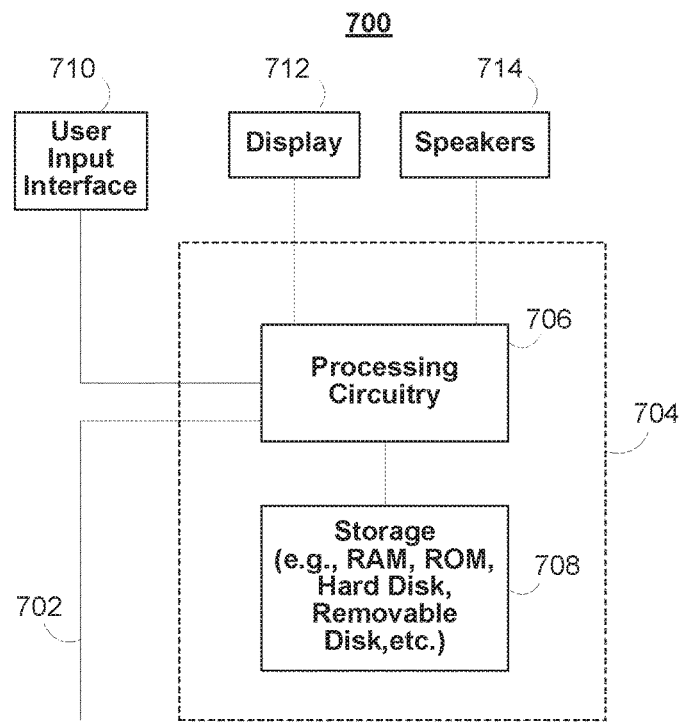
FIG. 7 is a block diagram of an illustrative user equipment device, in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
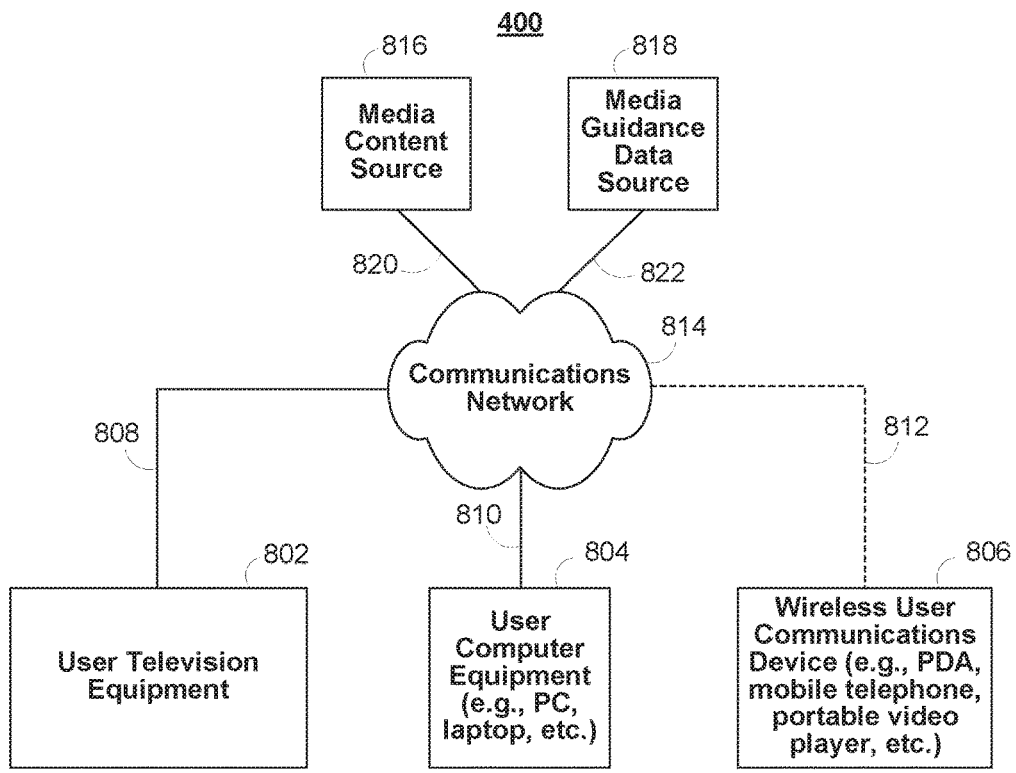
FIG. 8 is a block diagram of an illustrative media system, in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider.

Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
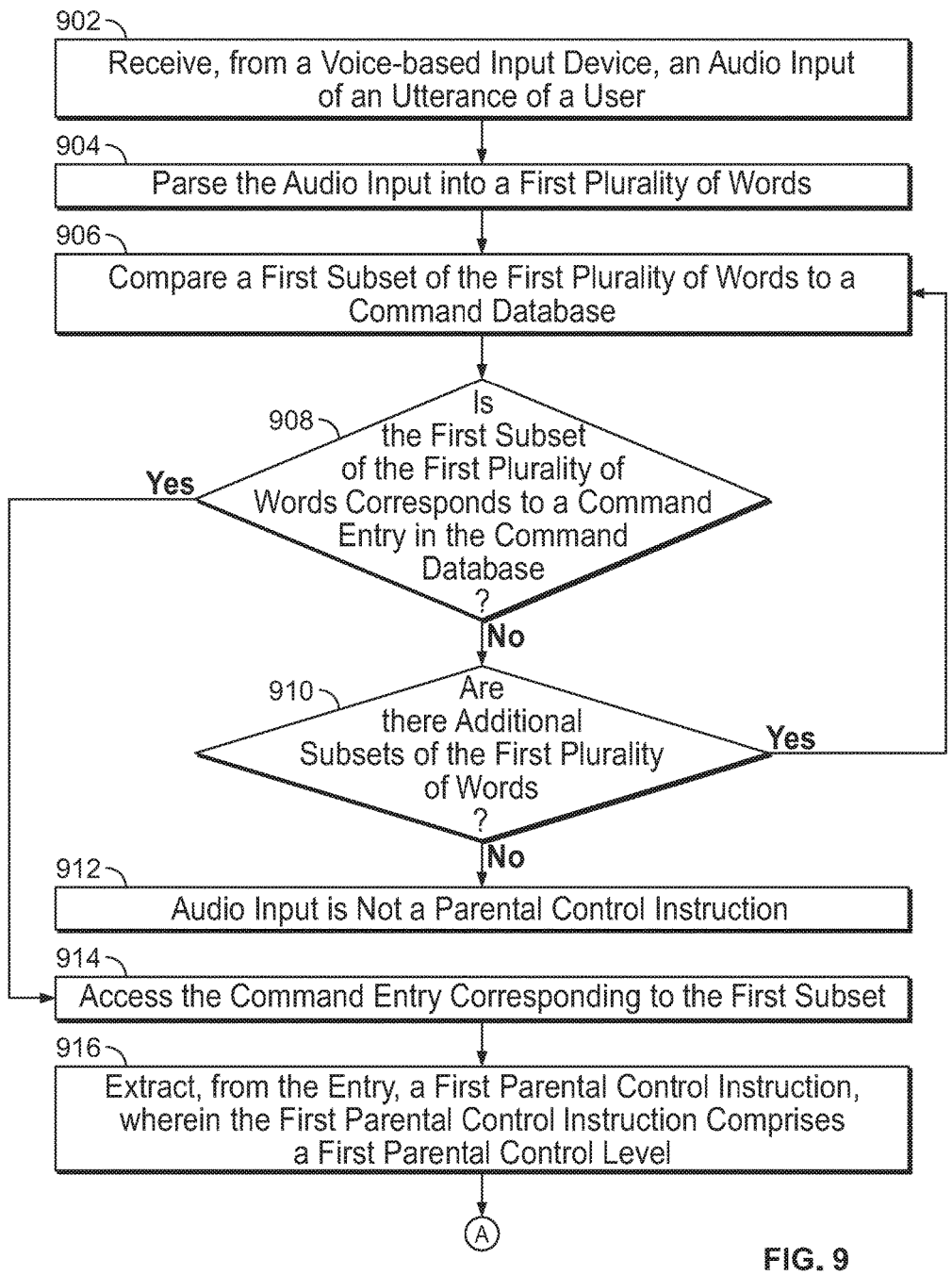
FIG. 9 is a flowchart of illustrative steps for controlling permissions to change parental control settings based on vocal characteristics of a user, in accordance with some embodiments of the disclosure.
Figure 9:
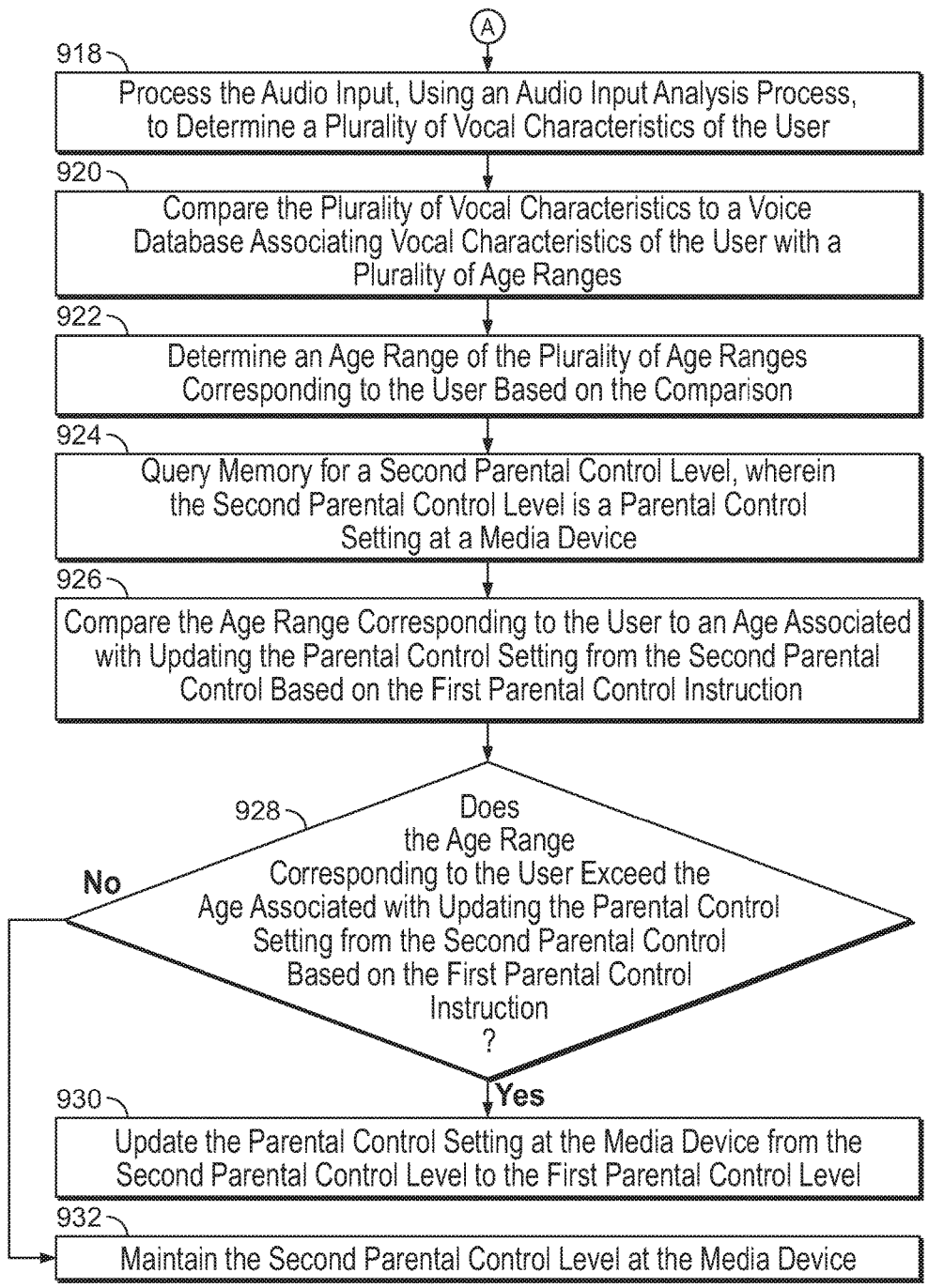

FIG. 9 is a flowchart of illustrative steps for controlling permissions to change parental control settings based on vocal characteristics of a user, in accordance with some embodiments of the disclosure. For example, a media guidance application may instruct control circuitry 706 to execute the elements of process 900.

Process 900 begins at 902, where the media guidance application receives (e.g., via control circuitry 706), from a voice-based input device (e.g., voice-based input device 106 or user input interface 710), an audio input of an utterance of a user. For example, the media guidance application may receive (e.g., via control circuitry 706), over a communication link (e.g., communications link 108) from the voice-based input device, an audio input of the user saying "Unblock PG-rated movies."

Process 900 continues to 904, where the media guidance application parses (e.g., via control circuitry 706) the audio input into a first plurality of words. In some embodiments, the media guidance application may run (e.g., via control circuitry 706) a natural language understanding subprocess, retrieved from memory (e.g., storage 708), locally (e.g., at user equipment device 802) to convert the audio clip into a string of words. In other embodiments, the media guidance application may transmit (e.g., via control circuitry 706 over communications network 814) the audio input to a server or other dedicated processor (e.g., media guidance data source 818) to parse the audio input into the first plurality of words (e.g., "Unblock," "PG-rated," and "Movies").

Process 900 continues to 906, where the media guidance application compares (e.g., via control circuitry 706) a first subset of the first plurality of words to a command database (e.g., media guidance data source 818). For example, the media guidance application may retrieve (e.g., from storage 708 or from media guidance data source 818 over communications network 814) a data structure or table (e.g., table 302) comprising a plurality of parental control update commands and a plurality of parental control levels. For example, the plurality of parental control update commands may be "Unblock," "Block," "Allow," and "Prevent." The plurality of parental control levels may be "G," "PG," "PG-13," "R," "Violence," "Language," "Sexual content," "Nudity," "Purchasing," "Purchasing+[monetary value]" "TV-G," "TV-PG," "TV-14," "TV-MA," "E," "E-10-Plus," "T," and "M." The media guidance application may determine (e.g., via control circuitry 706) that "PG" (a first subset) relates to the same parental control level in the command database. The media guidance application may therefore determine (e.g., via control circuitry 706) that the audio input comprises a parental control instruction.

Process 900 continues to 908, where the media guidance application determines (e.g., via control circuitry 706) whether the first subset of the first plurality of words corresponds to a command entry in the command database (e.g., media guidance data source 818). If the media guidance application determines that the first subset of the first plurality of words does not correspond to a command entry in the command database (e.g., if the first subset of the first plurality of words had been "movies"), process 900 continues to 910, where the media guidance application determines (e.g., via control circuitry 706) whether there are additional subsets of the first plurality of words. If the media guidance application determines (e.g., via control circuitry 706) that there are additional subsets of the first plurality of words, process 900 returns to 906, where the media guidance application compares (e.g., via control circuitry 706) a new subset of the first plurality of words to the command database. If the media guidance application, at 910, determines (e.g., via control circuitry 706) that there are no additional subsets of the first plurality of words, process 900 continues to 912, where the media guidance application determines (e.g., via control circuitry 706) that the audio input is not a parental control instruction.

If the media guidance application determines, at 908, that the first subset of the first plurality of words corresponds to a command entry in the command database (e.g., media guidance data source 818), process 900 continues to 914, where the media guidance application accesses (e.g., via control circuitry 706 from media guidance data source 818 over communications network 814) the command entry corresponding to the first subset. For example, the media guidance application may query (e.g., via control circuitry 706) the command database (e.g., media guidance data source 818) for the command entry corresponding to the "PG." The media guidance application may receive (e.g., via control circuitry 706 over communications network 814), in response, the command entry.

Process 900 continues to 916, where the media guidance application extracts (e.g., via control circuitry 706), from the entry, a first parental control instruction, where the first parental control instruction comprises a first parental control level. For example, the media guidance application may extract (e.g., via control circuitry 706), by executing an SQL script utilizing the declarative "Select" command, from the command entry, the first parental control instruction to "unblock PG-13 rated content." The first parental control instruction may include the first parental control level of "PG-13."

Process 900 continues to 918, where the media guidance application processes (e.g., via control circuitry 706) the audio input, using an audio input analysis process, to determine a plurality of vocal characteristics of the user. In some embodiments, the media guidance application may run (e.g., via control circuitry 706) the audio input analysis process, which may be stored in memory (e.g., in storage 708) locally (e.g., at user television equipment 802) to determine the plurality of vocal characteristics. In other embodiments, the media guidance application may transmit (e.g., via control circuitry 706 over communications network 814) the audio input to a server or other dedicated processor (e.g., media guidance data source 818) to determine the plurality of vocal characteristics. For example, the media guidance application may determine (e.g., via control circuitry 706) that the audio input has a speaking rate of 3.3 words per second, a mean fundamental frequency of 330 Hertz, and an average word duration of 45 milliseconds.

Process 900 continues to 920, where the media guidance application compares (e.g., via control circuitry 706) the plurality of vocal characteristics to a voice database associating vocal characteristics of the user with a plurality of age ranges. For example, the media guidance application may access (e.g., from storage 708 or from media guidance data source 818 over communications network 814) a table (e.g., table 402) that associates vocal characteristics (e.g., vocal characteristics 404) with a plurality of age ranges (e.g., age ranges 406).

Process 900 continues to 922, where the media guidance application determines (e.g., via control circuitry 706) an age range of the plurality of age ranges corresponding to the user based on the comparison. For example, the media guidance application may determine that the age range corresponding to the user is twelve to sixteen based on the comparison of the user's vocal characteristics with the voice database (e.g., table 402). More details regarding determining the age range corresponding to the user are given above in relation to FIG. 4.

Process 900 continues to 924, where the media guidance application queries (e.g., via control circuitry 706) memory (e.g., storage 708) for a second parental control level, wherein the second parental control level is a parental control setting at a media device. For example, the media guidance application may access (e.g., via control circuitry 706), from the memory (e.g., storage 708), that the parental control level at the media device (e.g., media device 110 or user television equipment 802) is blocking all programming that is rated higher than "G."

Process 900 continues to 926, where the media guidance application compares (e.g., via control circuitry 706) the age range corresponding to the user to an age associated with updating the parental control setting from the second parental control based on the first parental control instruction. For example, the media guidance application may compare (e.g., via control circuitry 706) the age range of twelve to sixteen, which corresponds to the user, to an age associated with updating the parental control setting from blocking all programming that is rated higher than "G" to unblocking "PG-rated" content, which may be ten years old. Additional details regarding determining the age associated with determining an age associated with updating the parental control setting from the second parental control based on the first parental control instruction are provided above in relation to FIG. 4.

Process 900 continues to 928, where the media guidance application determines (e.g., via control circuitry 706) whether the age range corresponding to the user exceeds the age associated with updating the parental control setting from the second parental control based on the first parental control instruction, which may be based on the above comparison, and which is described in more detail in relation to FIG. 4. If the media guidance application determines (e.g., via control circuitry 706) that the age range exceeds the age, process 900 continues to 930, where the media guidance application updates (e.g., via control circuitry 706) the parental control setting at the media device (e.g., user television equipment 802) from the second parental control level to the first parental control level. For example, if the media guidance application determines (e.g., via control circuitry 706) that the age range of twelve to sixteen, which corresponds to the user, exceeds the age associated with updating the parental control setting from blocking all programming that is rated higher than "G" to unblocking "PG-rated" content, which may be ten, the media guidance application may update (e.g., via control circuitry 706) the parental control setting at the media device (e.g., user television equipment 802) to blocking all programming that is rated higher than "PG-rated" and thus unblock "PG-rated" content. The media guidance application may make this update by accessing a memory location indicating the parental control setting, substituting the new parental control setting, and restore a data structure in the memory location.

If, at 928, the media guidance application determines (e.g., via control circuitry 706) that the age range does not exceed the age, process 900 continues to 932, where the media guidance application maintains (e.g., via control circuitry 706) the second parental control level at the media device (e.g., user television equipment 802). For example, if the media guidance application determines (e.g., via control circuitry 706) that the age range of the user is six to nine (e.g., at 922), the media guidance application may determine (e.g., via control circuitry 706) that the age range exceeds the age associated with updating the parental control setting from blocking all programming that is rated higher than "G" to unblocking "PG-rated" content, which may be ten. In response, the media guidance application may maintain (e.g., via control circuitry 706) the parental control level at the media device (e.g., user television equipment 802) at blocking all programming that is rated higher than "G-rated," thus keeping PG-rated content blocked.

Figure 10:
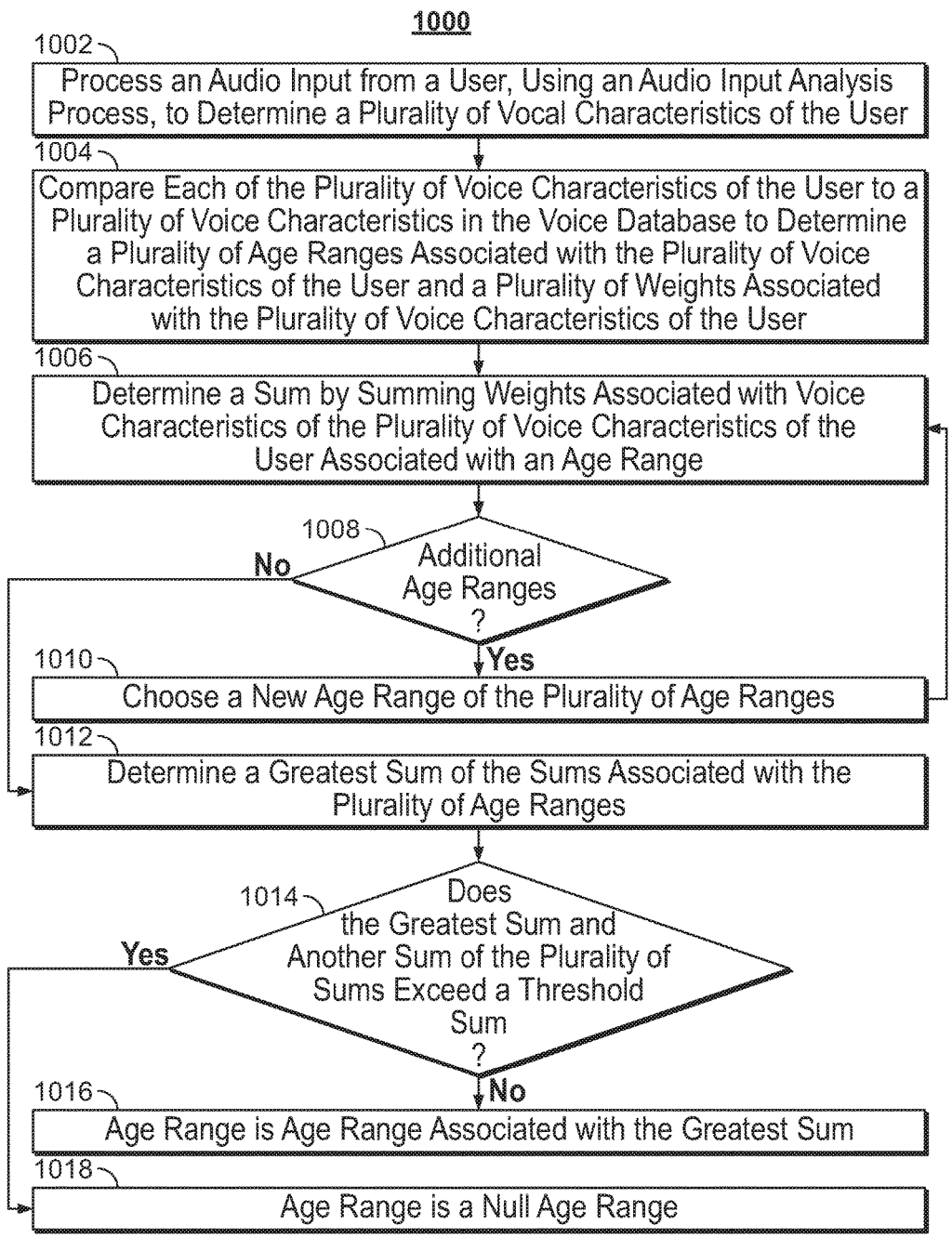
FIG. 10 is a flowchart of illustrative steps for determining an age range of a user based on vocal characteristics of the user in an audio input, in accordance with some embodiments of the disclosure.

FIG. 10 is a flowchart of illustrative steps for determining an age range of a user based on vocal characteristics of the user in an audio input, in accordance with some embodiments of the disclosure. For example, a media guidance application may instruct control circuitry 706 to execute the elements of process 1000.

Process 1000 begins at 1002, where the media guidance application processes (e.g., via control circuitry 706) an audio input (e.g., audio input of utterance 114) from a user (e.g., user 102), using an audio input analysis process, to determine a plurality of vocal characteristics. In some embodiments, the media guidance application may run (e.g., via control circuitry 706) the audio input analysis process, which may be stored in memory (e.g., in storage 708) locally (e.g., at user television equipment 802) to determine the plurality of vocal characteristics. In other embodiments, the media guidance application may transmit (e.g., via control circuitry 706 over communications network 814) the audio input to a server or other dedicated processor (e.g., media guidance data source 818) to determine the plurality of vocal characteristics. For example, the media guidance application may determine (e.g., via control circuitry 706) that the audio input has a speaking rate of 3.3 words per second, a mean fundamental frequency of 330 Hertz, and an average word duration of 45 milliseconds.

Process 1000 continues to 1004, where the media guidance application compares (e.g., via control circuitry 706) each of the plurality of voice characteristics of the user to a plurality of voice characteristics in a voice database (e.g., table 402) to determine a plurality of age ranges associated with the plurality of voice characteristics of the user and a plurality of weights associated with the plurality of voice characteristics of the user. For example, the media guidance application may compare (e.g., via control circuitry 706) the speaking rate of 3.3 words per second to a table in the voice database (e.g., table 402) to determine that it is associated with an age range of three to twelve and a weight of 0.5, the mean fundamental frequency of 330 Hertz to the table to determine that it is associated with an age range of twelve to sixteen and a weight of 0.5, and the average word duration of 45 milliseconds to the table to determine that it is associated with an age range of twelve to sixteen and with a weight of 0.9. This may be done in a similar manner to that described above in relation to FIG. 4.

Process 1000 continues to 1006, where the media guidance application determines (e.g., via control circuitry 706) a sum by summing weights associated with voice characteristics of the plurality of voice characteristics of the user associated with an age range. For example, the media guidance application may determine (e.g., via control circuitry 706) that the sum associated with the age range of twelve to sixteen is the sum of the weight of 0.5 associated with the mean fundamental frequency of 330 Hertz and the weight of 0.9 associated with the average word duration of 45 milliseconds, or 1.4.

Process 1000 continues to 1008, where the media guidance application determines (e.g., via control circuitry 706) if there are additional age ranges. If the media guidance application determines that there are additional age ranges, process 1000 continues to 1010, where the media guidance application chooses (e.g., via control circuitry 706) a new age range of the plurality of age ranges. For example, if the media guidance application determines (e.g., via control circuitry 706) that the age range of three to twelve has not been analyzed, the media guidance application may choose the age range of three to twelve at the next age range to analyze. Process 1000 returns to 1006, where the media guidance application determines (e.g., via control circuitry 706) a new sum for the new chosen age range, which may be 0.5.

If, at 1008, the media guidance application determines that there are no additional age ranges to analyze, process 1000 continues to 1012, where the media guidance application determines (e.g., via control circuitry 706) a greatest sum of the sums associated with the plurality of age ranges. For example, the media guidance application may determine (e.g., via control circuitry 706) that the sum of 1.4 is the highest sum (when compared to the sum of 0.5 for the age range three to twelve).

Process 1000 continues to 1014, where the media guidance application determines (e.g., via control circuitry 706) whether the greatest sum and another sum of the plurality of sums exceed a threshold sum. For example, the media guidance application may access (e.g., via control circuitry 706) the threshold sum (e.g., from storage 708 or from media guidance data source 818 over communications network 814), which may be a predetermined value (e.g., always 1.0). In some embodiments, the media guidance application may calculate (e.g., via control circuitry 706) the threshold sum using a formula (e.g., stored in storage 708 or at media guidance data source 818). For example, the media guidance application may determine that the threshold sum is fifty percent of the greatest sum, or 0.7.

If, at 1014, the media guidance application determines (e.g., via control circuitry 706) that one or both of the greatest sum and another sum of the plurality of sums do not exceed the threshold sum, process 1000 continues to 1016, where the media guidance application determines (e.g., via control circuitry 706) that the age range is the age range associated with the greatest sum. For example, the media guidance application may determine (e.g., via control circuitry 706) that only the greatest sum of 1.4 is greater than the threshold sum (e.g., 1.0), and therefore determine that the age range for the user (e.g., user 102) is twelve to sixteen, which was associated with the sum of 1.4.

If, at 1014, the media guidance application determines (e.g., via control circuitry 706) that the greatest sum and another sum of the plurality of sums exceed the threshold sum, process 1000 continues to 1018, where the media guidance application determines (e.g., via control circuitry 706) that the age range is the null age range, as there may be too much uncertainty as to the age of the user. For example, the media guidance application may determine (e.g., via control circuitry 706) that the greatest sum of 1.4 and another sum, e.g., the sum for the age range of three to twelve, which may be 1.1, are both greater than the threshold sum (e.g., 1.0), and therefore determine that the age range for the user (e.g., user 102) is the null age range.

Figure 11:
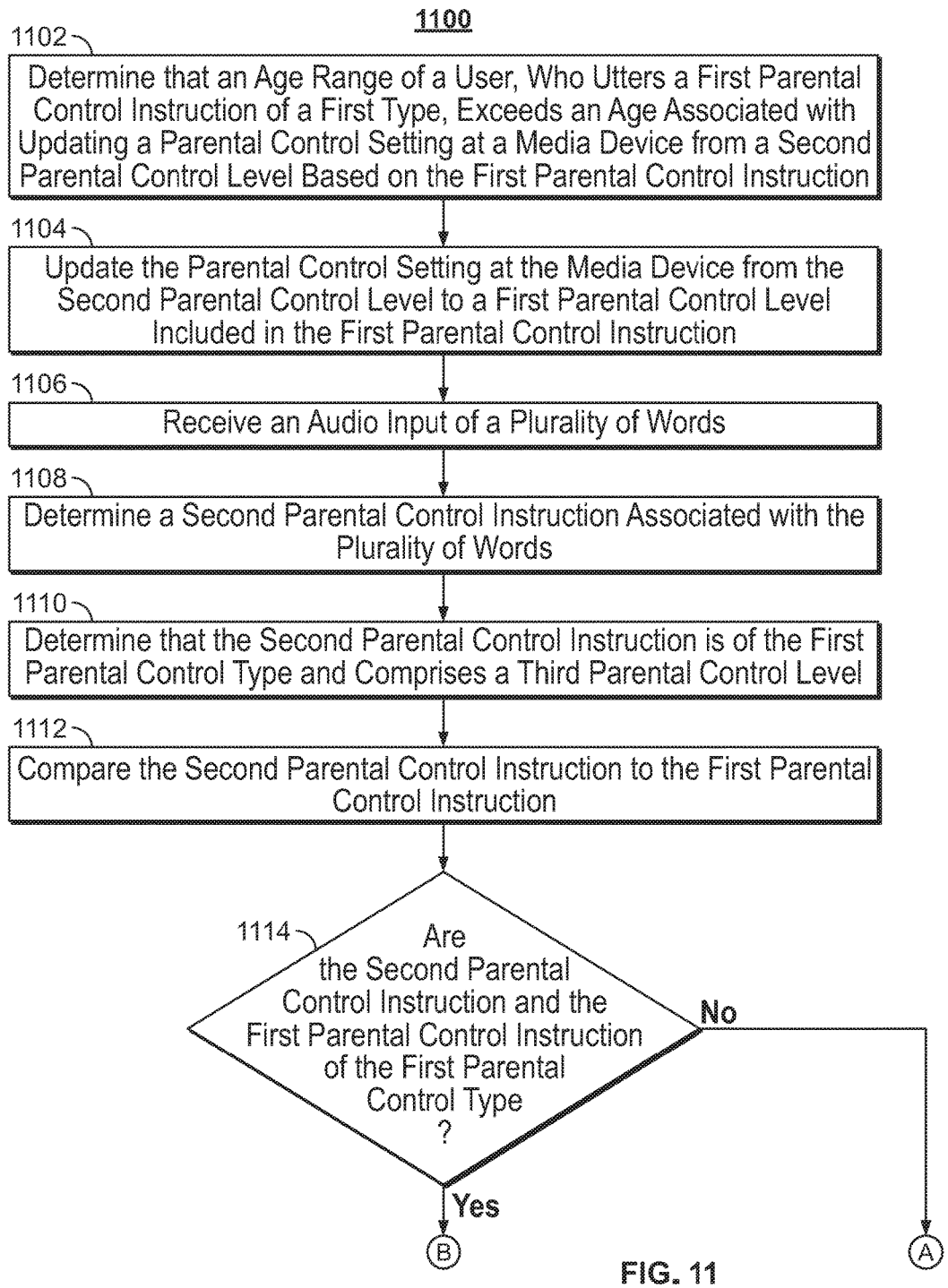
FIG. 11 is a flowchart of illustrative steps for controlling permissions to change parental control settings subsequent to an initial update, in accordance with some embodiments of the disclosure.
Figure 11:
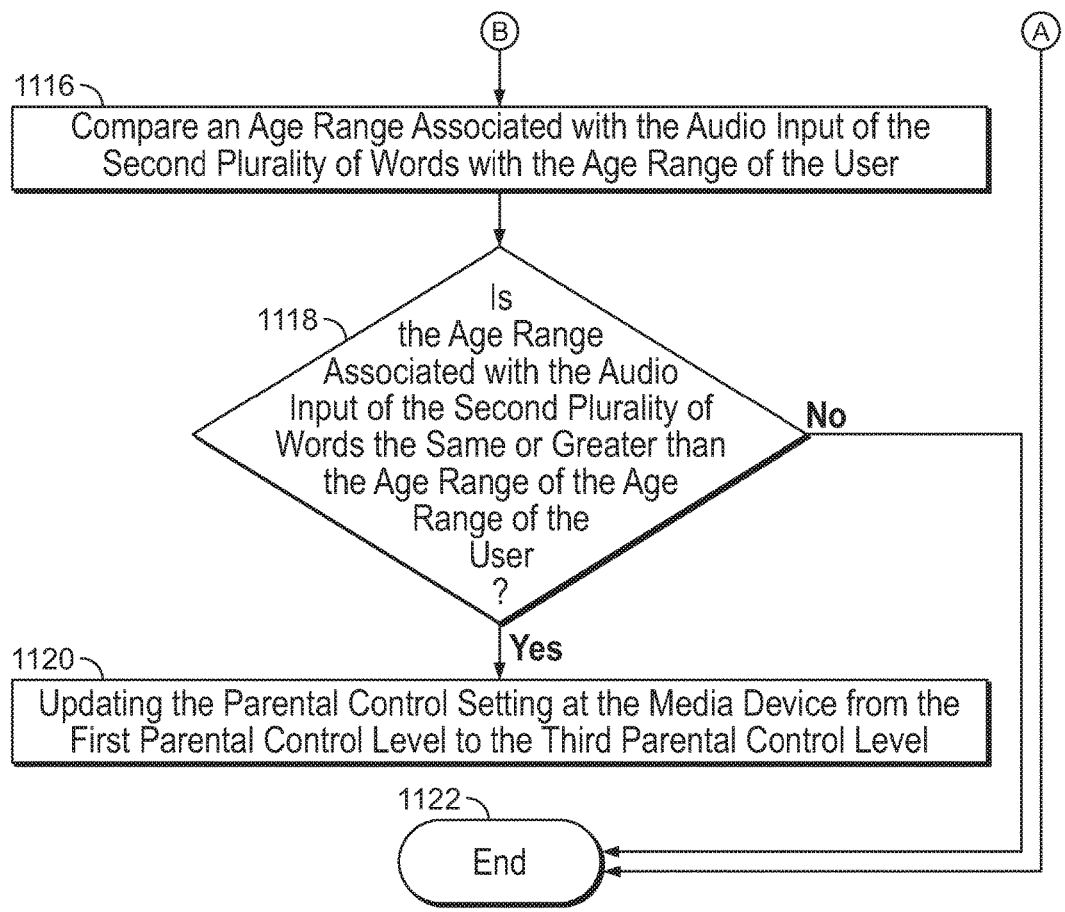

FIG. 11 is a flowchart of illustrative steps for controlling permissions to change parental control settings subsequent to an initial update, in accordance with some embodiments of the disclosure. For example, a media guidance application may instruct control circuitry 706 to execute the elements of process 1100.

Process 1100 begins at 1102, where the media guidance application determines (e.g., via control circuitry 706) that an age range of a user, who utters a first parental control instruction of a first type, exceeds an age associated with updating a parental control setting at a media device (e.g., media device 110 or user television equipment 802) from a second parental control level based on the first parental control instruction. For example, the media guidance application may determine (e.g., via control circuitry 706) that the age range of the user is twelve to sixteen in a similar manner as described above in relation to 920 and 922 in FIG. 9. The media guidance application may determine (e.g., via control circuitry 706) that the age associated with updating the parental control setting at the media device (e.g., media device 110 or user television equipment 802) from, for example, blocking all content rated higher than R-rated to blocking all content rated R-rated or higher may be ten years old in a similar manner as described above in relation to 926 and 928 in FIG. 9. The media guidance application may therefore determine (e.g., via control circuitry 706) that the age range of twelve to sixteen exceeds the age associated with the update.

Process 1100 continues to 1104, where the media guidance application updates (e.g., via control circuitry 706) the parental control setting at the media device from the second parental control level to a first parental control level included in the first parental control instruction. This may be done in a similar manner to that described above in relation to 930 in FIG. 9.

Process 1100 continues to 1106, where the media guidance application receives (e.g., via control circuitry 706) an audio input of a plurality of words. For example, the media guidance application may receive (e.g., via control circuitry 706) from a voice-based input device (e.g., user input interface 710 or voice-based input device 106 over communications link 108) an audio input of a user saying "Unblock R-rated movies."

Process 1100 continues to 1108, where the media guidance application determines (e.g., via control circuitry 706) a second parental control instruction associated with the plurality of words. This may be done in a similar manner to that described above in relation to 908, 914, and 916 of FIG. 9. For example, the media guidance application may determine that the second parental control instruction is to "Unblock all R-rated content."

Process 1100 continues to 1110, where the media guidance application determines (e.g., via control circuitry 706) that the second parental control instruction is of a first parental control type and comprises a third parental control level. For example, the media guidance application may access (e.g., via control circuitry 706 from storage 708) a data structure associated with the second parental control instruction to determine that the first parental control type is "MPAA rating-based access" and that the third parental control level is "R-rated."

Process 1100 continues to 1112, where the media guidance application compares (e.g., via control circuitry 706) the second parental control instruction to the first parental control instruction. For example, the media guidance application may compare (e.g., via control circuitry 706) the data in the data field relating the parental control type of the first parental control instruction with the parental control instruction associated with the second parental control instruction (e.g., "MPAA rating-based access").

Process 1100 continues to 1114, where the media guidance application determines (e.g., via control circuitry 706) whether the first parental control instruction and the second parental control instruction are of the first parental control type. If the media guidance application determines (e.g., via control circuitry 706) that the first parental control instruction is not of the first parental control type (e.g., its type is "purchasing permissions," "video game rating-based access," "automatic television shut-off time," etc.), process 1100 continues to 1122, where process 1100 ends, and the second parental control instruction may be analyzed in a similar manner as described above in relation to FIG. 9. For example, the media guidance application may determine (e.g., via control circuitry 706) that the second parental control instruction may be of the "MPAA rating-based access" parental control type, and that the first parental control instruction may be of the "purchasing permissions" type.

If, at 1114, the media guidance application determines (e.g., via control circuitry 706) that the first parental control instruction is of the first parental control type, process 1100 continues to 1116, where the media guidance application compares (e.g., via control circuitry 706) an age range associated with the audio input of the second plurality of words with the age range of the user that issued the first parental control instruction. For example, the media guidance application may compare (e.g., via control circuitry 706) the age range of twelve to sixteen, which may be associated with the second parental control instruction, to the age range of twelve to sixteen, which may be associated with the first parental control instruction, to determine that they are the same age range.

Process 1100 continues to 1118, where the media guidance application determines (e.g., via control circuitry 706) whether the age range associated with the audio input of the second plurality of words is the same or greater than the age range of the user. If the media guidance application determines (e.g., via control circuitry 706) that the age range associated with the audio input of the second plurality of words is less than the age range of the user, process 1100 continues to 1122, where process 1100 ends, and the second parental control instruction may be analyzed in a similar manner as described above in relation to FIG. 9.

If, at 118, the media guidance application determines (e.g., via control circuitry 706) that the age range associated with the audio input of the second plurality of words is the same or greater than the age range of the user, process 1100 continues to 1120, where the media guidance application updates (e.g., via control circuitry 706) the parental control setting at the media device (e.g., media device 110 or user television equipment 802) to the third parental control level. For example, the media guidance application may determine (e.g., via control circuitry 706) that the age range associated with the second plurality of words is twelve to sixteen, and that the age range of the user who issued the first parental control instruction is also twelve to sixteen, and in response, update the parental control setting from "blocking all R-rated (or higher)" content to blocking all content rated R-rated or higher to blocking all content rated higher than R-rated. Note that, normally, making such an update may be associated with an age that exceeds the age range of the second user (e.g., 18, which would exceed the age range of twelve to sixteen of the user). However, because a twelve- to sixteen-year-old user originally blocked R-rated content, then the system will allow a twelve- to sixteen-year-old (or older) user to unblock R-rated content, even if he or she normally could not.

The above-described embodiments of the present disclosure are presented for purposes of illustration and not of limitation, and the present disclosure is limited only by the claims that follow. Additionally, it should be noted that any of the devices or equipment discussed in relation to FIGS. 7-8 could be used to perform one or more of the steps in processes 900-1100 in FIGS. 9-11, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with additional steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

What is claimed is:

1. A method for determining whether to update parental control restrictions based on a voice of a user, the method comprising:
   receiving, from a voice-based input device, an audio input of an utterance of a user;
   based on receiving the audio input:
      parsing the audio input into a first plurality of words;
      comparing a first subset of the first plurality of words to a command database to determine that the first subset of the first plurality of words corresponds to a command entry in the command database;
      based on determining that the first subset corresponds to the command entry in the command database:
         accessing the command entry corresponding to the first subset;
         extracting, from the entry, a first parental control instruction, wherein the first parental control instruction comprises a first parental control level;
         processing the audio input, using an audio input analysis process, to determine a plurality of vocal characteristics of the user;
         comparing the plurality of vocal characteristics to a voice database associating vocal characteristics of the user with a plurality of age ranges;
         based on the comparison, determining an age range of the plurality of age ranges corresponding to the user;
         querying memory for a second parental control level, wherein the second parental control level is a parental control setting at a media device;
         comparing the age range corresponding to the user to an age associated with updating the parental control setting from the second parental control level based on the first parental control instruction to determine whether the age range corresponding to the user exceeds the age associated with updating the parental control setting from the second parental control level based on the first parental control instruction; and
         updating the parental control setting at the media device from the second parental control level based to the first parental control level if the age range exceeds the age associated with updating the parental control setting from the second parental control level based on the first parental control instruction.

2. The method of claim 1, wherein determining the age range corresponding to the user comprises:
   comparing each of the plurality of vocal characteristics of the user to a plurality of vocal characteristics in the voice database to determine a plurality of age ranges associated with the plurality of vocal characteristics of the user and a plurality of weights associated with the plurality of vocal characteristics of the user;

determining a plurality of sums, wherein each sum of the plurality of sums is associated with a respective age range of the plurality of age ranges, and wherein each sum is calculated by summing weights associated with vocal characteristics of the plurality of vocal characteristics of the user associated with the respective age range;

determining a greatest sum of the plurality of sums; and determining that the age range is an age range associated with the greatest sum.

3. The method of claim 2, wherein determining the age range corresponding to the user further comprises:

determining that at least two of the plurality of sums exceed a threshold sum; and based on determining the at least two of the plurality of sums exceed the threshold sum, determining that the age range is a null age range;

and wherein determining whether the age range corresponding to the user exceeds the age associated with updating the parental control setting from the second parental control level based on the first parental control instruction comprises:

determining that the age range corresponding to the user does not exceed the age associated with the first parental control instruction based on determining that the age range is a null age range; and maintaining the second parental control level at the media device based on determining that the age range does not exceed the age associated with updating the parental control setting from the second parental control level based on the first parental control instruction.

4. The method of claim 1, further comprising:

transmitting, to a parental control database, a request for a table associating a plurality of parental control instructions with a plurality of ages;

receiving, from the parental control database, a data packet containing the table;

comparing the first parental control level with the table to determine the age of the plurality of ages associated with the first parental control level.

5. The method of claim 4, further comprising:

comparing a second subset of the first plurality of words to the command database to determine a first parental control update command, wherein the first parental control instruction further comprises the first parental control update command; and wherein comparing the first parental control level with the table to determine the age associated with the parental control level comprises:

comparing the first parental control update command with the table to determine an age range associated with both the first parental control level and the first parental control update command to determine the age associated with the first parental control instruction.

6. The method of claim 1, wherein determining whether the age range corresponding to the user exceeds the age associated with updating the parental control setting from the second parental control level based on the first parental control instruction comprises:

comparing the second parental control level with the first parental control level;

determining whether the age associated with the second parental control level exceeds the age associated with the first parental control level; and wherein the age range corresponding to the user exceeds the age associated with updating the parental control setting from the second parental control level based on the first parental control instruction if the age associated with the second parental control level exceeds the age associated with the first parental control level.

7. The method of claim 1, wherein creating the voice database comprises:

receiving, from a plurality of media devices, a plurality of data structures, wherein the plurality of data structures comprise a plurality of audio inputs and a plurality of indications of ages of a plurality of users, wherein each data structure contains a respective audio input of the plurality of audio inputs associated with an age of a respective user in the audio input;

processing the plurality of audio inputs to determine a plurality of sets of vocal characteristics;

determining, for each vocal characteristic, an average signature associated with each age based on the plurality of sets of vocal characteristics to create a plurality of average signatures; and associating each of the plurality of average signatures with a respective age in a data structure.

8. The method of claim 1, wherein the first parental control instruction is associated with a first parental control type, the method further comprising:

determining that the age range exceeds the age associated with updating the parental control setting from the second parental control level based on the first parental control instruction;

subsequent to updating the parental control setting at the media device from the second parental control level to the first parental control level, receiving an audio input of a second plurality of words;

determining a second parental control instruction associated with the second plurality of words, wherein the second parental control instruction is of the first parental control type, and wherein the second parental control instruction comprises a third parental control level;

comparing the second parental control instruction to the first parental control instruction to determine that the second parental control instruction and the first parental control instruction are both of the first parental control type;

comparing an age range associated with the audio input of the second plurality of words with the age range of the user to determine that the age range associated with the audio input of the second plurality of words is the same or exceeds the age range of the age range of the user; and based on determine that the second parental control instruction and the first parental control instruction are both of the first parental control type, and that the age range associated with the audio input of the second plurality of words is the same or exceeds the age range of the age range of the user, updating the parental control setting at the media device from the first parental control level to the third parental control level.

9. The method of claim 1, further comprising:

determining that the age range does not exceed the age associated with updating the parental control setting from the second parental control level based on the first parental control instruction;

maintaining the second parental control level at the media device based on determining that the age range does not exceed the age associated with updating the parental control setting from the second parental control level based on the first parental control instruction
notifying the user that the second parental control level will be maintained;
receiving an audio input of a second user authorized to change the second parental control level to the first parental control level on the media device;
processing the audio input of the second user to determine that the audio input of the second user includes an instruction affirming the first parental control instruction; and
updating the parental control setting at the media device from the second parental control level to the first parental control level based on determining that the audio input of the second user includes the instruction affirming the first parental control instruction.

10. The method of claim 1, further comprising:
determining that the age range exceeds the age associated with updating the parental control setting from the second parental control level based on the first parental control instruction;
notifying the user that the parental control setting at the media device will be updated to the first parental control level;
receiving an audio input of a second user authorized to change the second parental control level to the first parental control level on the media device;
processing the audio input of the second user to determine that the audio input of the second user includes an instruction negating the first parental control instruction; and
reverting the parental control setting at the media device from the first parental control level back to the second parental control level based on determining that the audio input of the second user includes the instruction negating the first parental control instruction.

11. A system for determining whether to update parental control restrictions based on a voice of a user, the system comprising:
control circuitry configured to:
receive, from a voice-based input device, an audio input of an utterance of a user;
based on receiving the audio input:
parse the audio input into a first plurality of words;
compare a first subset of the first plurality of words to a command database to determine that the first subset of the first plurality of words corresponds to a command entry in the command database;
based on determining that the first subset corresponds to the command entry in the command database:
access the command entry corresponding to the first subset;
extract, from the entry, a first parental control instruction, wherein the first parental control instruction comprises a first parental control level;
process the audio input, using an audio input analysis process, to determine a plurality of vocal characteristics of the user;
compare the plurality of vocal characteristics to a voice database associating vocal characteristics of the user with a plurality of age ranges;
based on the comparison, determine an age range of the plurality of age ranges corresponding to the user;
query memory for a second parental control level, wherein the second parental control level is a parental control setting at a media device;
compare the age range corresponding to the user to an age associated with updating the parental control setting from the second parental control level based on the first parental control instruction to determine whether the age range corresponding to the user exceeds the age associated with updating the parental control setting from the second parental control level based on the first parental control instruction; and
update the parental control setting at the media device from the second parental control level based to the first parental control level if the age range exceeds the age associated with updating the parental control setting from the second parental control level based on the first parental control instruction.

12. The system of claim 11, wherein the control circuitry is configured to determine the age range corresponding to the user by:
comparing each of the plurality of vocal characteristics of the user to a plurality of vocal characteristics in the voice database to determine a plurality of age ranges associated with the plurality of vocal characteristics of the user and a plurality of weights associated with the plurality of vocal characteristics of the user;
determining a plurality of sums, wherein each sum of the plurality of sums is associated with a respective age range of the plurality of age ranges, and wherein each sum is calculated by summing weights associated with vocal characteristics of the plurality of vocal characteristics of the user associated with the respective age range;
determining a greatest sum of the plurality of sums; and
determining that the age range is an age range associated with the greatest sum.

13. The system of claim 12, wherein the control circuitry is further configured to determine the age range corresponding to the user by:
determining that at least two of the plurality of sums exceed a threshold sum; and
based on determining the at least two of the plurality of sums exceed the threshold sum, determining that the age range is a null age range;
and wherein the control circuitry is configured to determine whether the age range corresponding to the user exceeds the age associated with updating the parental control setting from the second parental control level based on the first parental control instruction by:
determining that the age range corresponding to the user does not exceed the age associated with the first parental control instruction based on determining that the age range is a null age range; and
maintaining the second parental control level at the media device based on determining that the age range does not exceed the age associated with updating the parental control setting from the second parental control level based on the first parental control instruction.

14. The system of claim 11, wherein the control circuitry is further configured to:
transmit, to a parental control database, a request for a table associating a plurality of parental control instructions with a plurality of ages;
receive, from the parental control database, a data packet containing the table;

compare the first parental control level with the table to determine the age of the plurality of ages associated with the first parental control level.

15. The system of claim 14, wherein the control circuitry is further configured to:
compare a second subset of the first plurality of words to the command database to determine a first parental control update command, wherein the first parental control instruction further comprises the first parental control update command; and
wherein the control circuitry is configured to compare the first parental control level with the table to determine the age associated with the parental control level by:
comparing the first parental control update command with the table to determine an age range associated with both the first parental control level and the first parental control update command to determine the age associated with the first parental control instruction.

16. The system of claim 11, wherein the control circuitry is configured to determine whether the age range corresponding to the user exceeds the age associated with updating the parental control setting from the second parental control level based on the first parental control instruction by:
comparing the second parental control level with the first parental control level;
determining whether the age associated with the second parental control level exceeds the age associated with the first parental control level; and
wherein the age range corresponding to the user exceeds the age associated with updating the parental control setting from the second parental control level based on the first parental control instruction if the age associated with the second parental control level exceeds the age associated with the first parental control level.

17. The system of claim 11, wherein the control circuitry is configured to create the voice database by:
receiving, from a plurality of media devices, a plurality of data structures, wherein the plurality of data structures comprise a plurality of audio inputs and a plurality of indications of ages of a plurality of users, wherein each data structure contains a respective audio input of the plurality of audio inputs associated with an age of a respective user in the audio input;
processing the plurality of audio inputs to determine a plurality of sets of vocal characteristics;
determining, for each vocal characteristic, an average signature associated with each age based on the plurality of sets of vocal characteristics to create a plurality of average signatures; and
associating each of the plurality of average signatures with a respective age in a data structure.

18. The system of claim 11, wherein the first parental control instruction is associated with a first parental control type, and wherein the control circuitry is further configured to:
determine that the age range exceeds the age associated with updating the parental control setting from the second parental control level based on the first parental control instruction;
subsequent to updating the parental control setting at the media device from the second parental control level to the first parental control level, receive an audio input of a second plurality of words;
determine a second parental control instruction associated with the second plurality of words, wherein the second parental control instruction is of the first parental control type, and wherein the second parental control instruction comprises a third parental control level;
compare the second parental control instruction to the first parental control instruction to determine that the second parental control instruction and the first parental control instruction are both of the first parental control type;
compare an age range associated with the audio input of the second plurality of words with the age range of the user to determine that the age range associated with the audio input of the second plurality of words is the same or exceeds the age range of the age range of the user; and
based on determine that the second parental control instruction and the first parental control instruction are both of the first parental control type, and that the age range associated with the audio input of the second plurality of words is the same or exceeds the age range of the age range of the user, update the parental control setting at the media device from the first parental control level to the third parental control level.

19. The system of claim 11, wherein the control circuitry is further configured to:
determine that the age range does not exceed the age associated with updating the parental control setting from the second parental control level based on the first parental control instruction;
maintain the second parental control level at the media device based on determining that the age range does not exceed the age associated with updating the parental control setting from the second parental control level based on the first parental control instruction
notify the user that the second parental control level will be maintained;
receive an audio input of a second user authorized to change the second parental control level to the first parental control level on the media device;
process the audio input of the second user to determine that the audio input of the second user includes an instruction affirming the first parental control instruction; and
update the parental control setting at the media device from the second parental control level to the first parental control level based on determining that the audio input of the second user includes the instruction affirming the first parental control instruction.

20. The system of claim 11, wherein the control circuitry is further configured to:
determine that the age range exceeds the age associated with updating the parental control setting from the second parental control level based on the first parental control instruction;
notify the user that the parental control setting at the media device will be updated to the first parental control level;
receive an audio input of a second user authorized to change the second parental control level to the first parental control level on the media device;
process the audio input of the second user to determine that the audio input of the second user includes an instruction negating the first parental control instruction; and
revert the parental control setting at the media device from the first parental control level back to the second parental control level based on determining that the audio input of the second user includes the instruction negating the first parental control instruction.

* * * * *